(12) United States Patent
Platonov et al.

(10) Patent No.: US 11,709,542 B2
(45) Date of Patent: Jul. 25, 2023

(54) VR SNORKELING SYSTEM

(71) Applicant: Shhuna GmbH, Munich (DE)

(72) Inventors: Juri Platonov, Grünwald (DE); Pawel Dürr, Kaufering (DE)

(73) Assignee: SHHUNA GMBH, Munich (DE)

( * ) Notice: Subject to any disclaimer, the term of this patent is extended or adjusted under 35 U.S.C. 154(b) by 0 days.

(21) Appl. No.: 17/389,874

(22) Filed: Jul. 30, 2021

(65) Prior Publication Data
US 2022/0043507 A1 Feb. 10, 2022

(30) Foreign Application Priority Data
Aug. 6, 2020 (EP) .................................. 20189865

(51) Int. Cl.
*G06F 3/01* (2006.01)
*H04W 4/80* (2018.01)
(Continued)

(52) U.S. Cl.
CPC .............. *G06F 3/011* (2013.01); *B63C 11/16* (2013.01); *G06K 7/10306* (2013.01);
(Continued)

(58) Field of Classification Search
CPC .......... G06F 3/011; H04W 4/80; B63C 11/16; G06K 7/10306; G06T 19/006
(Continued)

(56) References Cited

U.S. PATENT DOCUMENTS

| 7,782,253 B1 * | 8/2010 | Brown | B63C 11/205 |
| | | | 342/357.57 |
| 2014/0098215 A1 * | 4/2014 | Dinis | B63C 11/02 |
| | | | 348/81 |

(Continued)

OTHER PUBLICATIONS

European Search Report for EP 20189865.7 dated Jan. 29, 2021, 10 pages.

*Primary Examiner* — Prabodh M Dharia
(74) *Attorney, Agent, or Firm* — Dority & Manning, P.A.

(57) ABSTRACT

A multi-user virtual reality system for providing a virtual reality experience to a plurality of users in a body of water includes a reference system adapted for emitting and/or receiving signals. The multi-user virtual reality system includes equipment configured to be mounted to a first user in the body of water, wherein the equipment includes a first display unit and a first signal emitting or receiving system adapted for emitting and/or receiving signals. The multi-user virtual reality system includes equipment configured to be mounted to a second user in the body of water, wherein the equipment includes a second display unit and a second signal emitting or receiving system adapted for emitting and/or receiving signals. The multi-user virtual reality system includes a data processing system including one or more data processing units. The data processing system is configured for determining a position of the first user in the body of water based on at least one signal transmitted between the first signal emitting or receiving system and the reference system. The data processing system is configured for deter- (Continued)

mining a position of the second user in the body of water based on at least one signal transmitted between the second signal emitting or receiving system and the reference system. The data processing system is configured for determining whether the second user in the body of water is within a first target region 480 relative to the first user in the body of water. The data processing system is configured for instructing the first display unit to display virtual reality content to the first user in the body of water. If it is determined that the second user in the body of water is inside the first target region relative to the first user, the displayed virtual reality content includes a representation of the second user.

18 Claims, 9 Drawing Sheets

(51) Int. Cl.
*B63C 11/16* (2006.01)
*G06K 7/10* (2006.01)
*G06T 19/00* (2011.01)
*B63C 11/12* (2006.01)

(52) U.S. Cl.
CPC ............. *G06T 19/006* (2013.01); *H04W 4/80* (2018.02); *B63C 2011/121* (2013.01)

(58) Field of Classification Search
USPC ................ 345/156, 633; 348/81; 342/357.57
See application file for complete search history.

(56) References Cited

U.S. PATENT DOCUMENTS

| | | | |
|---|---|---|---|
| 2016/0005232 A1* | 1/2016 | Quarles | G02B 27/017 345/633 |
| 2016/0203365 A1* | 7/2016 | Breedvelt-Schouten | G02B 27/017 345/633 |
| 2016/0350973 A1 | 12/2016 | Burger et al. | |
| 2019/0094540 A1 | 3/2019 | Greenwood et al. | |
| 2020/0356161 A1* | 11/2020 | Wagner | A63G 31/007 |
| 2021/0003844 A1* | 1/2021 | Greenwood | G06T 19/006 |

* cited by examiner

VR SNORKELING SYSTEM

CROSS-REFERENCE TO RELATED APPLICATIONS

The present application is based upon and claims the right of priority to EP Application No. 20189865.7, filed Aug. 6, 2020, the disclosure of which is hereby incorporated by reference herein in its entirety for all purposes.

FIELD

Embodiments of the present disclosure relate to virtual reality systems for providing a virtual reality experience to users in a body of water, such as a swimming pool. Embodiments of the present disclosure also relate to a swimming mask assembly for providing a virtual reality experience to a user in a body of water.

BACKGROUND

In various applications, virtual reality systems for immersing a user in an artificial, or "virtual", environment are provided. A virtual reality system can involve a head-mounted display which is mounted to the user's head. The head-mounted display shows a sequence of images to the user. The images shown depend on the position and movement of the user's head and create a virtual world in which the user is able to look around and move around. The virtual world generated by the virtual reality system can simulate an environment which exists in the real world or can be completely different.

Virtual reality systems can be used, for example, in swimming pools. A head-mounted display can be worn by a user while the user is in the swimming pool. When the user's head is underwater, the head-mounted display can show images of an underwater environment to the user, e.g. including fish and underwater plants, giving the user in the swimming pool the impression of snorkeling in an exotic ocean.

Existing virtual reality systems for swimming pools can involve a tether for restraining the movement of the user. That is, using the tether, the user is kept in a relatively fixed location in the swimming pool, i.e. the user cannot swim around freely in the swimming pool. Such systems have the drawback that they can cause discomfort for the user, such as motion sickness, due to the fact that the virtual reality images give the user the impression of swimming freely in the displayed underwater environment, whereas the real-life motion of the user's body is in fact restrained. This mismatch between the virtual images and the real-life state of the user's body often results in motion sickness.

Further, existing virtual reality systems can involve complex installations which can be installed permanently in large venues such as public swimming pools or water parks. Yet, such complex installations are not adapted for providing the virtual reality systems to small-scale venues, such as e.g. users of a private swimming pool which want to temporarily install and use a virtual reality system for one afternoon and afterwards remove it again so that the swimming pool can be used again in a normal way.

Therefore, there is a need for improved virtual reality systems for providing a virtual reality experience to users in a body of water.

SUMMARY

According to an embodiment, a multi-user virtual reality system for providing a virtual reality experience to a plurality of users in a body of water is provided. The multi-user virtual reality system includes a reference system adapted for emitting and/or receiving signals. The multi-user virtual reality system includes equipment configured to be mounted to a first user in the body of water, wherein the equipment includes a first display unit and a first signal emitting or receiving system adapted for emitting and/or receiving signals. The multi-user virtual reality system includes equipment configured to be mounted to a second user in the body of water, wherein the equipment includes a second display unit and a second signal emitting or receiving system adapted for emitting and/or receiving signals. The multi-user virtual reality system includes a data processing system including one or more data processing units. The data processing system is configured for determining a position of the first user in the body of water based on at least one signal transmitted between the first signal emitting or receiving system and the reference system. The data processing system is configured for determining a position of the second user in the body of water based on at least one signal transmitted between the second signal emitting or receiving system and the reference system. The data processing system is configured for determining whether the second user in the body of water is within a first target region relative to the first user in the body of water. The data processing system is configured for instructing the first display unit to display virtual reality content to the first user in the body of water. If it is determined that the second user in the body of water is inside the first target region relative to the first user, the displayed virtual reality content includes a representation of the second user.

According to a further embodiment, a method for providing a virtual reality experience to a plurality of users in a body of water is provided. The method includes mounting equipment to a first user, the equipment including a first display unit and a first signal emitting or receiving system. The method includes mounting equipment to a second user, the equipment including a second display unit and a second signal emitting or receiving system. The method includes transmitting at least one signal between the first signal emitting or receiving system and a reference system. The method includes determining a position of the first user in the body of water based on the at least one signal transmitted between the first signal emitting or receiving system and the reference system. The method includes transmitting at least one signal between the second signal emitting or receiving system and the reference system. The method includes determining a position of the second user in the body of water based on the at least one signal transmitted between the second signal emitting or receiving system and the reference system. The method includes determining whether the second user in the body of water is within a first target region relative to the first user in the body of water. The method includes displaying, using the first display unit, virtual reality content to the first user in the body of water, wherein, if it is determined that the second user in the body of water is inside the first target region relative to the first user, the displayed virtual reality content includes a representation of the second user.

According to a further embodiment, a computer program for providing a virtual reality content to a first user of a plurality of users in a body of water is provided. The computer program includes instructions which, when the program is executed by a computer, cause the computer to carry out the following operations: determining a position of the first user in the body of water, or acquiring data regarding the position of the first user in the body of water;

determining a position of a second user in the body of water, or acquiring data regarding the position of second user in the body of water; determining whether the second user in the body of water is within a first target region relative to the first user in the body of water; and instructing a display unit to display virtual reality content to the first user in the body of water, wherein, if it is determined that the second user in the body of water is inside the first target region relative to the first user, the displayed virtual reality content includes a representation of the second user.

According to a further embodiment, a swimming mask assembly is provided. The swimming mask assembly includes a swimming mask. The swimming mask assembly includes a display unit. The swimming mask assembly includes a signal emitting or receiving system. The swimming mask assembly includes a wireless communication unit configured to communicate directly or indirectly with a further wireless communication unit of a further swimming mask assembly. The swimming mask assembly includes a data processing unit. The data processing unit is configured for determining a position of the swimming mask assembly based on at least one signal transmitted between the signal emitting or receiving system and a reference system. The data processing unit is configured for receiving data regarding a position of the further swimming mask assembly via the wireless communication unit. The data processing unit is configured for determining whether the further swimming mask assembly is within a first target region relative to the swimming mask assembly. The data processing unit is configured for instructing the display unit to display virtual reality content, wherein, if it is determined that the further swimming mask assembly is inside the first target region, the displayed virtual reality content includes a representation of a user wearing the further swimming mask assembly.

According to a further embodiment, a swimming mask assembly is provided. The swimming mask assembly includes a swimming mask. The swimming mask assembly includes a signal emitting or receiving system mounted to the swimming mask. The swimming mask assembly includes an enclosure mounted to the swimming mask. The enclosure includes a support for holding a mobile device, wherein the support includes one or more movable support elements configured for adjusting a relative position of the mobile device with respect to the swimming mask.

According to a further embodiment, a swimming mask assembly is provided. The swimming mask assembly includes a swimming mask. The swimming mask assembly includes a signal emitting or receiving system mounted to the swimming mask. The swimming mask assembly includes an enclosure mounted to the swimming mask. The enclosure includes a support for holding a mobile device in the enclosure, wherein the support is arranged adjacent to an exterior wall of the enclosure such that the mobile device held by the support can be recharged wirelessly through the exterior wall by a charging station outside the enclosure.

Embodiments are also directed at apparatuses for carrying out the disclosed methods and include apparatus parts for performing each described method aspect. These method aspects may be performed by way of hardware components, a computer programmed by appropriate software, by any combination of the two or in any other manner. Furthermore, embodiments according to the disclosure are also directed at methods for operating the described apparatus. The methods for operating the described apparatus include method aspects for carrying out every function of the apparatus.

BRIEF DESCRIPTION OF THE DRAWINGS

So that the manner in which the above recited features of the present disclosure can be understood in detail, a more particular description of the disclosure, briefly summarized above, may be had by reference to embodiments. The accompanying drawings relate to embodiments of the disclosure and are described in the following.

DETAILED DESCRIPTION

Reference will now be made in detail to the various embodiments of the disclosure, one or more examples of which are illustrated in the figures. Within the following description of the drawings, the same reference numbers refer to same components. Generally, only the differences with respect to individual embodiments are described. Each example is provided by way of explanation of the disclosure and is not meant as a limitation of the disclosure. Further, features illustrated or described as part of one embodiment can be used on or in conjunction with other embodiments to yield yet a further embodiment. It is intended that the description includes such modifications and variations.

Figure 1:
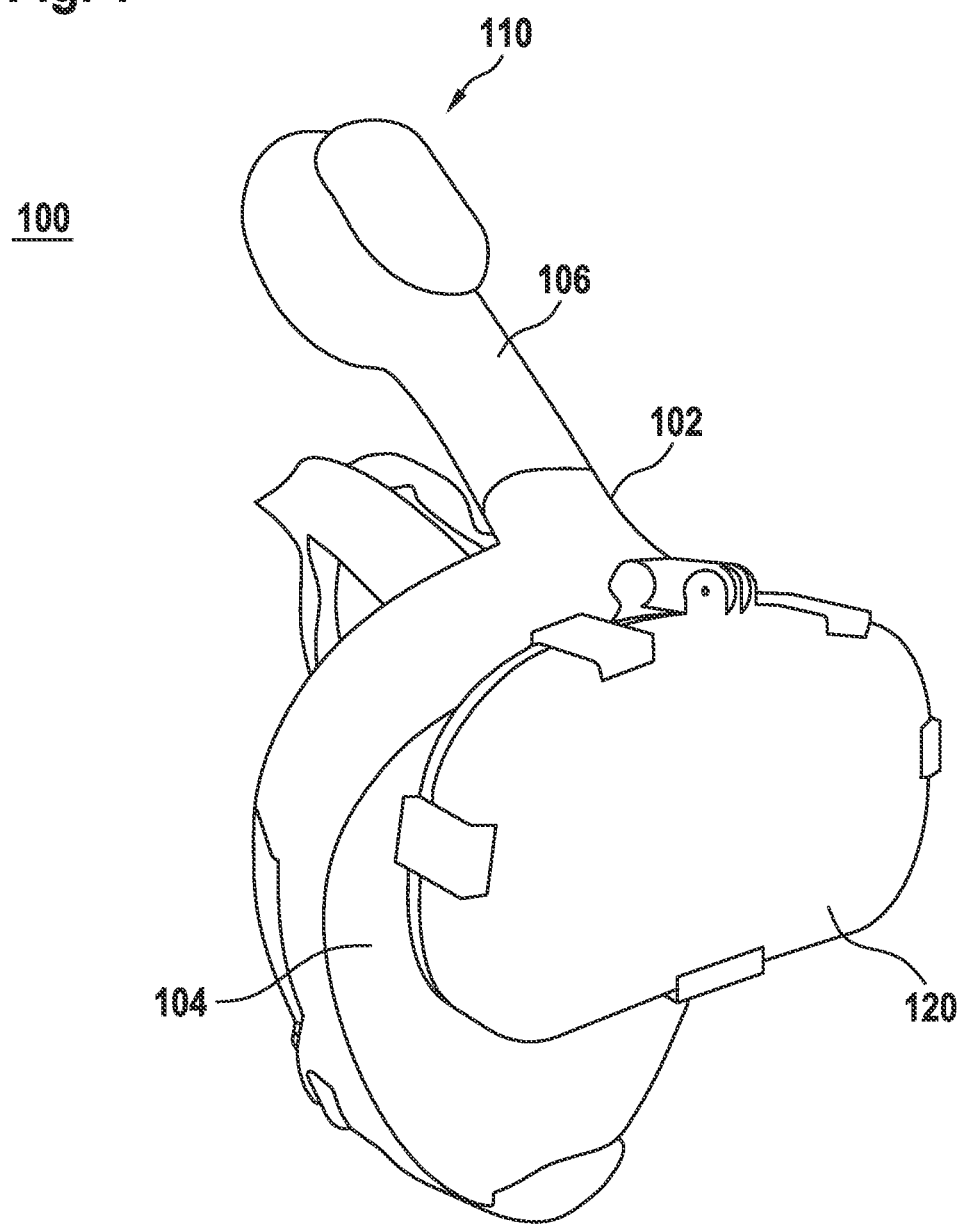
FIGS. 1-2 show a swimming mask assembly according to embodiments described herein.

FIG. 1 shows a swimming mask assembly 100 according to embodiments described herein.

A swimming mask assembly 100 can include a swimming mask 102. The swimming mask 102 can be worn by a user swimming in a body of water, e.g. a swimming pool.

A swimming mask 102 is configured to cover at least the user's eyes. A swimming mask 102 is configured to be mounted to the user's face in a water-tight manner so that a volume of air surrounds the user's eyes. A swimming mask 102 can fully cover the user's face, as shown for example in FIG. 1. Alternatively, a swimming mask 102 can only partly cover the user's face.

A swimming mask 102 may have a transparent front portion 104 configured to face the user's eyes so that the user wearing the swimming mask 102 can see through the transparent front portion 104. The swimming mask 102 may have a breathing tube 106, or snorkeling tube, for allowing the user to breathe while swimming at or near the surface of the water. In other examples, a swimming mask 102 without a breathing tube 106 can be provided.

A swimming mask assembly 100 may include a signal emitting or receiving system 110. The signal emitting or receiving system 110 may be mounted to the breathing tube 106, as shown in FIG. 1, or to a different part of the swimming mask 102. The signal emitting or receiving system 110 is configured for receiving and/or emitting signals. The signal emitting or receiving system 110 may include a receiver for receiving signals and/or an emitter for emitting signals. As will be described below, the signal emitting or receiving system 110 is used for determining a position of the swimming mask assembly 100 in the body of water. For example, the signal emitting or receiving system 110 may include an ultra-wide band (UWB) receiver or an infrared light-emitting diode (LED).

A swimming mask assembly 100 may include a display-receiving enclosure 120 mounted to the swimming mask 102. The display-receiving enclosure 120 may be mounted to the transparent front portion 104 of the swimming mask 102. A display-receiving enclosure 120 may be configured for receiving a display unit as described herein. In the example shown in FIG. 1, the display-receiving enclosure 120 is configured for receiving a mobile device, e.g. a smart phone, tablet or the like. The mobile device may be arranged in the display-receiving enclosure 120 such that a display unit of the mobile device faces the eyes of the user wearing the swimming mask 102. One or more lenses may be provided between the eyes of the user and the display-receiving enclosure 120 for improving the projection of the images displayed by the display unit in the display-receiving enclosure 120. A virtual reality content displayed by the display unit in the display-receiving enclosure 120 can be shown to the user while the user wearing the swimming mask 102 is swimming in the body of water, e.g. a swimming pool. For example, the virtual reality content can show an underwater oceanic scenery including exotic fish and plants, so that the user swimming in the swimming pool can have the impression of snorkeling in a beautiful far-away ocean.

The display-receiving enclosure 120 may be removably attached to the swimming mask 102, e.g. using magnets, suction cups, or the like. Removably attaching the display-receiving enclosure 120 allows the display-receiving enclosure 120 to be detached from the swimming mask 102 so that the mobile device can be inserted in and removed from the display-receiving enclosure 120, or to facilitate maintenance, cleaning or electrical charging of the parts inside the display-receiving enclosure 120. The display-receiving enclosure 120 can be waterproof so that the mobile device or any other electronic parts in the display-receiving enclosure 120 does not come into contact with water while the swimming mask 102 is in use.

Figure 2:
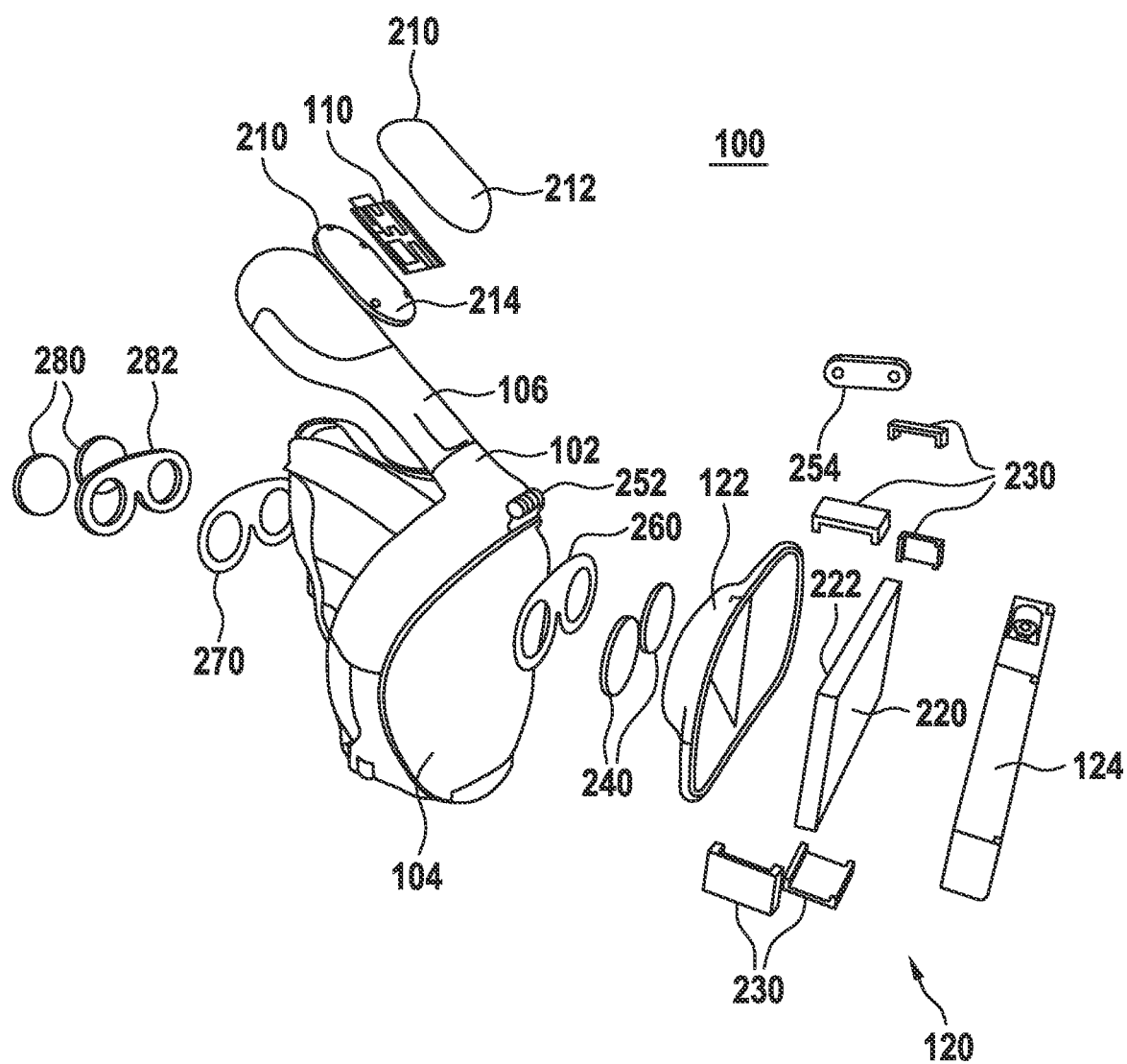

FIG. 2 shows a swimming mask assembly 100 according to embodiments described herein. The swimming mask assembly 100 includes a swimming mask 102, a signal emitting or receiving system 110 and a display-receiving enclosure 120.

The signal emitting or receiving system 110 can be arranged in an enclosure 210. The enclosure 210 may include a battery for supplying the signal emitting or receiving system 110 with electrical power. The enclosure 210 may include a wireless charging device.

The enclosure 210 may be removably attached to the breathing tube 106 or to a different part of the swimming mask 102, e.g. using Velcro, a magnetic element such as magnetic foil, or the like. Removably attaching the enclosure 210 allows the enclosure 210 to be detached from the swimming mask assembly 100 so that the signal emitting or receiving system 110 can be conveniently recharged.

The enclosure 210 can be waterproof so that the signal emitting or receiving system 110 does not come into contact with water while the swimming mask 102 is in use.

The enclosure 210 can include an enclosure portion 212 and an enclosure portion 214 which may be separable from each other. The enclosure portion 212 and the enclosure portion 214 engage with each other to form the enclosure 210. The enclosure portion 212 and the enclosure portion 214 forming the enclosure 210 can contact each other in a waterproof manner, so that the signal emitting or receiving system 110 inside the enclosure 210 does not get wet when the swimming mask 102 is in use, i.e. when a user wearing the swimming mask 102 is in the body of water.

A mobile device 220, e.g. a smartphone, can be arranged in the display-receiving enclosure 120. The display-receiving enclosure 120 can include an enclosure portion 122 and an enclosure portion 124 which may be separable from each other. The enclosure portion 122 and the enclosure portion 124 can engage with each other to form the display-receiving enclosure 120. The enclosure portion 122 and the enclosure portion 124 can contact each other in a waterproof manner, so that the mobile device 220 in the display-receiving enclosure 120 does not get wet when the swimming mask 102 is in use. The display-receiving enclosure 120 may include one or more securing elements 230, e.g. clips, clamps, screws or other fasteners, for ensuring that the enclosure portion 122 and the enclosure portion 124 are tightly contacting each other.

The enclosure portion 122 can be configured for facing the transparent front portion 104 of the swimming mask 102. The mobile device 220 can have a display unit 222. The display-receiving enclosure 120 can be configured for holding the mobile device 220 in a manner such that the display unit 222 faces the enclosure portion 122. The display-receiving enclosure 120 can have a transparent portion configured for facing the transparent front portion 104 of the swimming mask 102. For example, as shown in FIG. 2, the transparent portion of the display-receiving enclosure 120 can include, or be provided by, one or more transparent elements 240, for example, glass or plastic elements which may be part of the enclosure portion 122. An image displayed by the display unit of the mobile device 220 can be viewed by a user wearing the swimming mask 102, since light beams can travel from the display unit through the transparent portion of the display-receiving enclosure 120 (e.g. through the one or more transparent elements 240) and through the transparent front portion 104 of the swimming mask 102 and reach the user's eyes.

A swimming mask assembly 100 can include a mounting system for mounting, particularly detachably mounting, the display-receiving enclosure 120 to the swimming mask 102.

The mounting system can include one or more mounting elements. The one or more mounting elements may be configured for connecting a top portion of the display-receiving enclosure 120 to the swimming mask 102. For example, the one or more mounting elements may include a first mounting element 252 fixed to, or being part of, the swimming mask 102 (e.g. a go-pro mounting element of the swimming mask 102). The one or more mounting elements may include a second mounting element 254. A first side of the second mounting element 254 may be attached to the first mounting element 252, e.g. by a screw or other fastener. A second side of the second mounting element 254 opposite the first side can be attached (also using e.g. a screw) to the display-receiving enclosure 120, e.g. to a top portion of the display-receiving enclosure 120.

The mounting system can include one or more holding units 260. The one or more holding units 260 can be configured for connecting the display-receiving enclosure 120, particularly the enclosure portion 122, to a front portion of the swimming mask 102. A front portion of the swimming mask 102 can be understood as a portion facing the eyes of the user wearing the swimming mask 102. The one or more holding units 260 can be fixed to, or included in, the enclosure portion 122 of the display-receiving enclosure 120. The one or more holding units 260 can be configured for being detachably mounted to the transparent front portion 104 of the swimming mask 102.

The one or more holding units 260 can include one or more magnetic units, as shown for example in FIG. 2. For example, the one or more holding units 260 can be magnetic elements configured to magnetically engage with one or more magnetic units 270 arranged behind the transparent front portion 104 of the swimming mask 102. The one or more holding units 260 and the one or more magnetic units 270 can be arranged adjacent to, and on opposite sides of, the transparent front portion 104 of the swimming mask 102. The one or more holding units 260 and the one or more magnetic units 270 can be magnets having opposite polarities so that the one or more holding units 260 and the one or more magnetic units 270 are attracted to each other, thereby holding the display-receiving enclosure 120 in a fixed position mounted to the swimming mask 102.

A swimming mask assembly 100 may include one or more optical lenses 280. The one or more optical lenses 280 can be arranged in a lens holder 282. The one or more optical lenses 280 may be arranged in front of the eyes of the user wearing the swimming mask 102. The one or more optical lenses 280 may be arranged between the user's eyes and the transparent front portion 104 of the swimming mask 102. The one or more optical lenses 280 may provide focusing of the light traveling from the display unit to the user's eyes.

Several modifications can be made to the swimming mask assembly 100 shown in the figures, as described in the following.

The signal emitting or receiving system 110 need not be mounted to the breathing tube 106 but can be mounted to a different portion of the swimming mask 102, or even a different part of the user's body. In some embodiments, the swimming mask 102 may not have a breathing tube 106.

The display-receiving enclosure 120 may not be configured to include a mobile device 220 such as a smartphone or tablet. Alternatively, the display-receiving enclosure 120 may be configured to include a stand-alone display unit which is not part of a smartphone or tablet. The display-receiving enclosure 120 may include a processing unit connected to the display unit. The display unit and the processing unit may be separate systems. In other words, instead of a display unit and a processing unit which are two parts of one common mobile device, the display-receiving enclosure 120 may alternatively include a display unit and a processing unit as separate components. In further embodiments, the display-receiving enclosure 120 may not include a processing unit. The display unit in the display-receiving enclosure 120 may be operated by remote control by a processing unit which is arranged elsewhere, e.g. a central processing unit arranged on dry land i.e. outside of the body of water. In other embodiments, the processing unit may be mounted to the user but may not be part of the swimming mask assembly, e.g. the processing unit may be mounted to a part of the user's body other than the user's head, such as the user's back.

Alternative to one or more holding units 260 including magnetic units, the one or more holding units 260 can include suction units, e.g. suction cups. The suction units may be configured for mounting the display-receiving enclosure 120 to a front portion of the swimming mask 102. In such embodiments, the magnetic units 270 shown in FIG. 2 may not be present. The suction units may apply a suctioning force to a front portion of the swimming mask 102 in order to attach the display-receiving enclosure 120 to the swimming mask 102. Suction units provide an advantage over magnetic holding units in embodiments where a magnetometer (compass) is used for determining the position of the display unit or mobile device. Different from magnetic units, suction units do not interfere with the magnetic field and hence do not disturb the measurements of the magnetometer.

Figure 3:
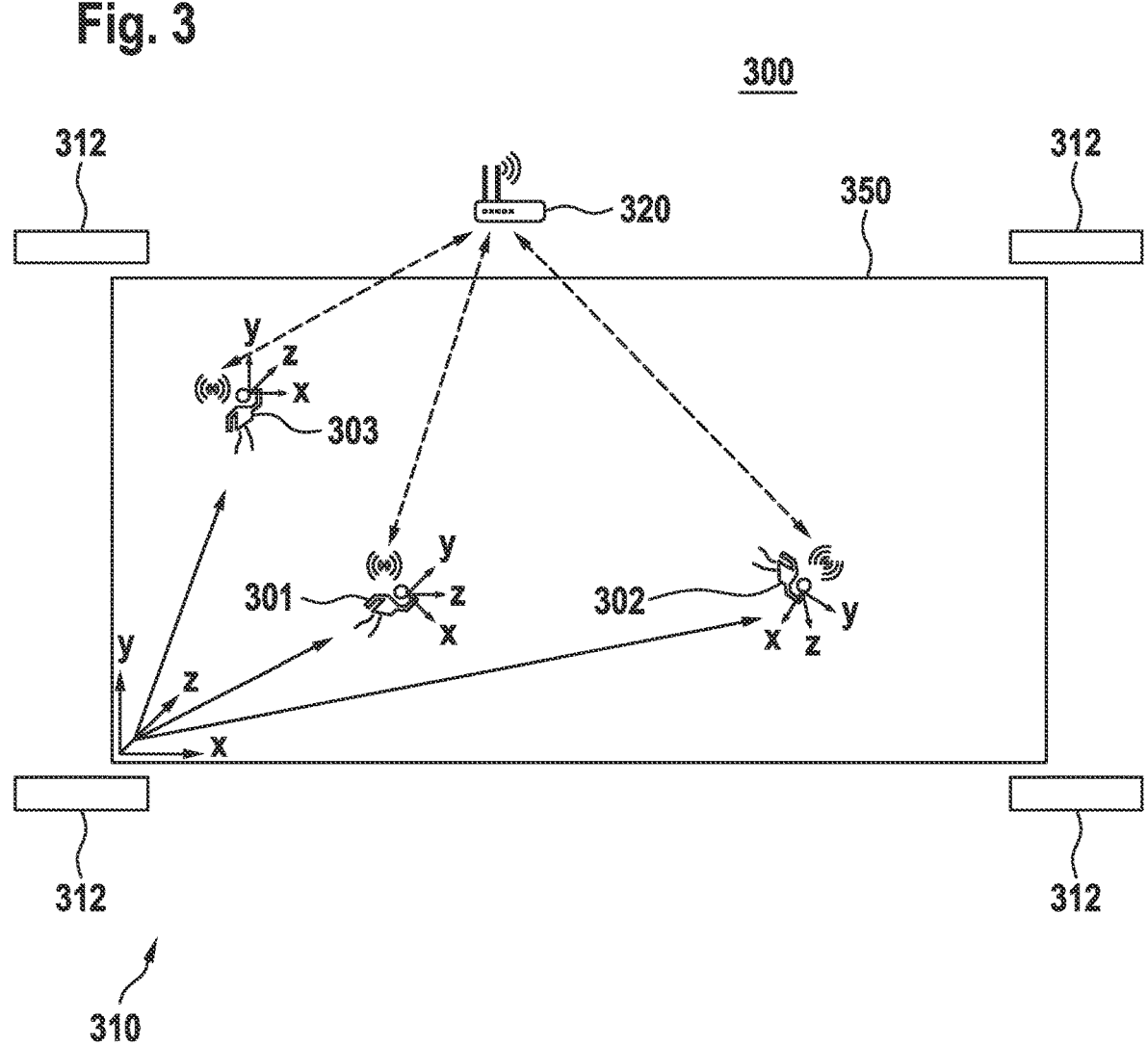
FIG. 3 shows a multi-user virtual reality system for providing a virtual reality experience to a plurality of users in a body of water according to embodiments described herein.

FIG. 3 shows a multi-user virtual reality system 300 for providing a virtual reality experience to a plurality of users in a body of water 350, according to embodiments described herein.

A body of water 350 as described herein can be a confined volume of water which is suitable for allowing a plurality of persons to swim in the body of water 350. A body of water 350 can have several meters in length and width to allow multiple persons to swim at the same time. A body of water 350 can be a swimming pool, e.g. a private or public swimming pool.

For example, a plurality of users may swim at a same time in the body of water 350. FIG. 3 shows three users 301, 302 and 303, but this is just an example. The multi-user virtual reality system 300 according to embodiments described herein can be suitable for providing a virtual reality experience to a plurality of users, such as 5 or more, 10 or more or 20 or more users.

The users can swim freely in the body of water 350. That a user can swim freely in the body of water 350 can be understood in the sense that the movement of the user is not restricted by a tether or other restraining device. There is no restraining device limiting the distance over which the user can swim on the body of water 350. The user can swim from an initial position in the body of water to an arbitrary final position the body of water 350. Apart from the physical boundaries of the body of water 350, there may be no limitations to how far and in which direction the user can swim in the body of water 350.

Each user in the body of water 350 may be wearing a swimming mask assembly as described herein, e.g. a swimming mask assembly 100 described with respect to FIGS. 1 and 2. More generally, each user may wear equipment including at least a display unit and a signal emitting or receiving system, as described herein. The signal emitting or receiving system is used for determining the position of each user in the body of water 350. The display unit is used for showing virtual reality content to the user.

The multi-user virtual reality system 300 may include a reference system 310. The reference system 310 may include one or more reference units 312. Each reference unit 312 may be configured for receiving and/or emitting signals.

As shown for example in FIG. 3, the body of water 350 may be rectangular (e.g. a swimming pool). A reference unit 312 may be arranged at each corner of the body of water 350. Whereas FIG. 3 shows an exemplary reference system 310 having four reference units 312, the reference system 310 may alternatively have fewer reference units 312. For example, a reference system 310 may include a single reference unit 312.

The multi-user virtual reality system 300 is configured for a transmission of signals between the reference system 310 and the signal emitting or receiving system 110 of each user in the body of water 350. The signal emitting or receiving system 110 of each user is configured to transmit at least one signal to the reference system 310 and/or to receive at least one signal from the reference system 310 to determine a position of the signal emitting or receiving system 110 in the body of water 350. Particularly, a position of the signal emitting or receiving system 110 relative to the reference system 310 can be determined.

For example, the reference system 310 can be a radio-based reference system, such as an UWB reference system. Each of the one or more reference units 312 may be a radio-based beacon configured for emitting a radio signal. For example, a plurality of radio-based beacons may be arranged around the periphery of the body of water 350, e.g.

along the side of a swimming pool. The signal emitting or receiving system 110 of each user may include a radio-based receiver for receiving the radio signals emitted by at least some of the radio-based beacons. For example, the radio-based receiver may be configured for receiving radio signals emitted by at least four radio-based beacons. Based on the received radio signals, a position of the signal emitting or receiving system 110 relative to the radio-based beacons can be determined, e.g. by triangulation.

In another example, a reference system 310 having a single reference unit 312 suffices to determine the position of each signal emitting or receiving system 110. The single reference unit 312 can be a radio-based beacon as described herein. The signal emitting or receiving system 110 of each user can include at least two radio-based receivers arranged at a distance from each other, e.g. two radio-based receivers arranged at different positions along the length of the breathing tube 106 of the swimming mask 102. The radio signal emitted by the single radio-based beacon is received by each of the two radio-based receivers. Based on the two received signals, in combination with the fact that the position of the two radio-based receivers relative to each other is known, the position of each radio-based receiver relative to the single radio-based beacon can be determined ("angle-of-arrival" measurement). Specifically, a signal emitting or receiving system 110 including at least two antennas for receiving a signal emitted by the reference unit 312 can be used to estimate both the angle of arrival of the signal as well as the distance from each antenna to the reference unit 312. The angle of arrival is estimated from the difference between the arrival of the signal at both antennas.

In yet another example, the reference system 310 can be an optical reference system. Each of the one or more reference units 312 may be a camera, e.g. an infrared (IR) camera. For example, a plurality of cameras may be arranged around the periphery of the body of water 350. The signal emitting or receiving system 110 of each user may include an optical emitter, e.g. an infrared light emitting diode (IR-LED), for emitting an optical signal. The optical signal, e.g. IR light, emitted by the optical emitter may be received by at least some of the cameras of the reference system 310. For example, the optical signal may be received by at least two cameras. Based on the optical signal, each camera generates an image. By combining multiple images, a position of the signal emitting or receiving system 110 relative to the cameras can be determined. In some implementations, the determination of the position of the signal emitting or receiving system 110 can be facilitated by providing a signal emitting or receiving system 110 including a plurality of IR-LEDs arranged in a pattern. In such implementations, a reference system including a single reference unit 312, e.g. a single camera, can be sufficient for determining the position of the signal emitting or receiving system 110.

Based on the signals transmitted between the reference system 310 and the signal emitting or receiving systems 110 of the respective users, the position of each signal emitting or receiving system 110, and hence the position of each user, can be calculated.

The position of each user can be determined locally, i.e. by respective data processing units carried by the users. For example, the signal(s) transmitted between the reference system 310 and the signal emitting or receiving system 110 of a given user can be transmitted to the mobile device 220 (e.g. smartphone) arranged in the display-receiving enclosure 120 of the swimming mask assembly 100 worn by that user. The position of the signal emitting or receiving system 110 of the user in question can be calculated locally by the mobile device 220 of that user.

Alternatively, the position of each signal emitting or receiving system 110 can be calculated by a central data processing unit, which may be located outside the body of water 350. The signals transmitted between the reference system 310 and the signal emitting or receiving systems 110 of each user can be transmitted to the central data processing unit. Based on these signals, the central data processing unit can calculate the positions of the respective signal emitting or receiving systems 110 of the users in the body of water 350.

The one or more reference units 312 of the reference system 310 may be arranged outside the body of water 350, i.e. on dry land. As compared to reference units which are arranged in the body of water 350, i.e. submerged reference units, arranging the reference units outside the body of water 350 provides several advantages. For example, radio-based beacons (e.g. UWB beacons) are not adapted for being submerged, so that a radio-based localization of the users is not available if the reference units are arranged underwater. Further, if an optical reference system is used, e.g. with the reference units being cameras, the range of a camera which is arranged underwater is much smaller than that of a camera arranged on dry land. Thus, underwater cameras are only suitable for short distances, i.e. relatively small swimming pools, whereas above-water cameras allow localizing users over much large distances, thereby providing the possibility of providing a multi-user virtual reality experience to a large number of users swimming freely in a large swimming pool. Further, placing a camera underwater would have the disadvantage that the field of view of the underwater camera can be occluded by a user swimming in front of the camera, which could compromise the calculation of the position of the other users in the body of water. Further, underwater reference units normally have to be installed in permanent manner, e.g. since they have to be attached to the pool walls. This makes such reference units less flexible. In comparison, placing reference units along the side of the swimming pool is easy and quick, and after use the reference unit can easily be removed again. This is particularly useful when the system according to embodiments described herein is to be installed for a relatively short period of time, such as an afternoon or an evening, e.g. for entertaining the guests of a private pool party.

The multi-user virtual reality system 300 may include a communication system.

The communication system allows the equipment (e.g. the swimming mask assemblies) carried by the respective users in the body of water 350 to communicate with each other. The communication can be a direct communication or an indirect communication.

For example, in embodiments where each user carries a mobile device 220, e.g. a smartphone or tablet, the communication system may include the wireless communication units (e.g. WIFI and/or Bluetooth units) of each of the mobile devices. The wireless communication units allow the mobile devices 220 of the different users to wirelessly communicate with each other. Alternatively or additionally, the communication system may include a central communication unit 320 (or server) which is configured for communicating with the equipment of each of the users, thereby providing an indirect communication between the users. The central communication unit 320 may also be omitted.

If the users carry their own data processing units (e.g. each user carrying a swimming mask assembly 100 with a mobile device 220), the communication system can be used for sending information regarding the position of each user to the respective data processing units of all other users in the body of water 350. Accordingly, the data processing unit of each user can receive information regarding the position of each other user in the body of water 350. Based on this position information, it can be determined which of the users in the body of water 350 are in each other's field of view. The virtual reality content shown to each user is configured such that a user will see, in the virtual reality content, a representation (avatar) of all other users which are within the user's field of view.

For example, with reference to FIG. 3, using the communication system, the mobile device 220 of user 301 may receive information regarding the position of user 302 and regarding the position of user 303. Based on this information, and possibly in combination with information regarding the spatial orientation of the mobile device 220 of user 301 to determine in which direction the user 301 is looking, the mobile device 220 of user 301 may determine that user 302 is in the field of view of user 301 and that user 303 is not in the field of view of user 301. Accordingly, the display unit of the mobile device 220 of user 301 may show a virtual reality content which includes a representation (avatar) of the user 302. Thus, the user 301 is able to "see" the user 302 in the virtual reality content displayed by the mobile device 220 of user 301. The representation of the user 302 may be shown in the virtual reality content in a position reflecting the actual position of the user 302 within the field of view of user 301. In comparison, since the user 303 is not in the field of view of the user 301, the virtual reality content shown to user 301 by the mobile device 220 of user 301 does not include a representation of the user 303, reflecting that the user 301 would at that moment not be able to see the user 303 in real life either. If a central data processing unit is used, the above procedure is performed similarly, but information is processed centrally rather that locally by each user's mobile device. The communication system can be used for sending information regarding the position of each user in the body of water 350 to the central data processing unit. Based on this information, the central data processing unit can determine, for each user in the body of water 350, which of the other users in the body of water 350 are in that user's field of view. The central data processing unit can instruct the display unit of each user to show a virtual reality content which shows representations of all other users which are in the field of view of the user in question.

Irrespective of whether the data is processed locally or centrally, the virtual reality content shown to each user may be updated depending on the movement of the other users. For example, the virtual reality content shown to a user may change as the positions of the other users in the body of water 350 change, as further users enter the body of water 350 or as users leave the body of water 350. Accordingly, the virtual reality content shown to each user includes moving images which may reflect the actual movements of the other users.

For example, when starting out from the situation shown in FIG. 3, the virtual reality content shown to the user 301 may show that the representation of the user 302 moves in the virtual reality content, wherein the movement of the representation of user 302 follows the actual movement of the user 302 in the body of water 350. For example, if the user 302 swims past the user 301 from right to left in real life, the representation of the user 302 in the virtual reality content shown to the user 301 may also appear as swimming past the user 301 from right to left. Likewise, the representation of the user 302 may "leave" the virtual reality content shown to the user 301 if the user 302 leaves the field of view of the user 301 in real life. Likewise, a representation of user 303 may enter the virtual reality content shown to the user 301 if the user 303 enters the field of view of user 301 in real life.

As described above, in order to determine whether a representation of a second user (e.g. user 302) is included in the virtual reality content shown to a first user (e.g. user 301), information regarding the position of the second user can be used. Further, also information regarding the spatial orientation of the second user can be used. The spatial orientation of the second user can be determined by a second orientation-determining system as described herein. For example, based on the spatial orientation of the display unit carried by the second user, it can be determined in which direction the second user is looking. In turn, this can allow determining the spatial orientation of the second user's body, so that it can be estimated where the second user's legs and feet may approximately be located. Based on this information, it may be determined that the swimming mask of the second user might be outside of the field of view of the first user but that a portion of the second user's body, e.g. the second user's legs, are inside the field of view of the first user. Accordingly, the virtual reality content shown to the first user may include a representation of at least a portion of the second user's body based on information regarding the spatial orientation of the second user in the body of water.

The virtual reality content can be generated, for example, using game engines such as Unity3d or Unreal.

Embodiments described herein thus provide a virtual reality experience wherein multiple users in the body of water can see representations of each other while the users swim in the body of water. Thereby, collisions between the different users in the body of water can be avoided. In turn, it is made possible that the users swim freely in the body of water, since they can see each other and can thus avoid each other if necessary. As compared to situations where the users cannot swim freely, e.g. systems where the users are held in a substantially fixed position by a tether or the like, this provides a much improved and more enjoyable virtual reality experience, wherein users can swim together and interact with each other. Further, by allowing the users to swim freely, unwanted side-effects such as motion sickness, which often occur when the users are held in a fixed position, are eliminated or at least greatly reduced.

In the examples above, it is described that the field of view is used as a characteristic for determining whether or not a representation of a user is included in the virtual reality content shown to another user. Apart from the field of view, other characteristics can be used. For example, an artificially constructed field of view can be considered, with a viewing angle which is larger than that of a human field of view. In such example, a representation of another user could be shown in the virtual content even if that user would not be visible in real life, i.e. even if that user would not be within the actual human field of view of the user to which the virtual reality content is shown. In other words, it is not necessary to use a standard human field of view for determining which users are shown to each other in the virtual reality content. Generally, is it is determined whether or not a second user is within a target region relative to a first user and if yes, the second user is included in the virtual reality content shown to the first user. The target region can be a field of view, a deformed field of view, or another target region.

In light of the above, according to an embodiment, a multi-user virtual reality system for providing a virtual reality experience to a plurality of users in a body of water is provided.

The multi-user virtual reality system includes a reference system adapted for emitting and/or receiving signals, e.g. reference system 310 shown in the figures.

The multi-user virtual reality system includes equipment configured to be mounted to a first user in the body of water, wherein the equipment includes a first display unit and a first signal emitting or receiving system adapted for emitting and/or receiving signals. The multi-user virtual reality system includes equipment configured to be mounted to a second user in the body of water, wherein the equipment includes a second display unit and a second signal emitting or receiving system adapted for emitting and/or receiving signals. For example, the first user and the second user can be users 301 and 302, respectively, shown in FIG. 3. The equipment mounted to each user can be a swimming mask assembly 100 including a mobile device 220 and a signal emitting or receiving system 110 as shown in FIGS. 1-2. The first display unit and the second display unit can be the respective display units of the mobile devices carried by the users 301 and 302. Alternatively, the first display unit and the second display unit can be stand-alone display units which are not integrated in a mobile device.

The multi-user virtual reality system includes a data processing system including one or more data processing units. For example, the data processing system can include the respective data processing units of mobile devices carried by the first user and the second user. In another example, the data processing system can include a central data processing unit as described herein.

The data processing system is configured for determining a position of the first user in the body of water based on at least one signal transmitted between the first signal emitting or receiving system and the reference system.

The data processing system is configured for determining a position of the second user in the body of water based on at least one signal transmitted between the second signal emitting or receiving system and the reference system.

The data processing system is configured for determining whether the second user in the body of water is within a first target region relative to the first user in the body of water. For example, the first target region may be a field of view of the first user.

The data processing system is configured for instructing the first display unit to display virtual reality content to the first user in the body of water. If it is determined that the second user in the body of water is inside the first target region relative to the first user, the displayed virtual reality content includes a representation of the second user.

The equipment configured to be mounted to the first user may include a first swimming mask assembly, e.g. a swimming mask assembly 100 as shown in FIGS. 1-2. The first swimming mask assembly may include a first swimming mask. The first swimming mask assembly may include the first display unit. The first swimming mask assembly may include the first signal emitting or receiving system.

The equipment configured to be mounted to the second user may include a second swimming mask assembly, e.g. a swimming mask assembly 100 as shown in FIGS. 1-2. The second swimming mask assembly may include a second swimming mask. The second swimming mask assembly may include the second display unit. The second swimming mask assembly may include the second signal emitting or receiving system.

The body of water may be a swimming pool, e.g. a private or public swimming pool.

The multi-user virtual reality system may be configured for allowing the first user and the second user to move freely in the body of water. The multi-user virtual reality system may be configured to adapt the virtual reality content displayed to the first user to the position of the first user depending on a movement of the first user in the body of water. The multi-user virtual reality system may be configured to adapt the virtual reality content displayed to the first user depending on a movement of the second user in the body of water.

At least a portion of the reference system may be arranged outside a periphery of the body of water. The reference system may include one or more reference units configured for transmitting and/or receiving signals. The one or more reference units may be arranged outside the periphery of the body of water.

The reference system may be an ultra-wide band reference system including one or more beacons or an optical reference system including one or more cameras. The reference system may be a radio-based reference system, particularly a radio-based ultra-wide band reference system. The reference system may include one or more radio-based beacons. The one or more radio-based beacons may be a single radio-based beacon or 2 or more, 5 or more, or 10 or more radio-based beacons.

The reference system may be an optical reference system including one or more cameras, e.g. IR cameras. The one or more cameras may be 2 or more, 5 or more, or 10 or more cameras.

FIGS. 4-8 show a multi-user virtual reality system 300 according to embodiments described herein. Equipment 410 is mounted to a first user in the body of water 350. The equipment 410 includes a first display unit 412 and a first signal emitting or receiving system 414 adapted for emitting and/or receiving signals. Equipment 420 is mounted to a second user in the body of water 350. The equipment 420 includes a second display unit 422 and a second signal emitting or receiving system 424 adapted for emitting and/or receiving signals. In the schematic representation shown in FIG. 4, the first and second user are not shown for ease of presentation.

A multi-user virtual reality system according to embodiments described herein can include a communication system providing a direct or indirect communication between the equipment which is configured to be mounted to the first user and the equipment which is configured to be mounted to the second user. The communication system can be configured for transmitting data regarding a position of the first user and/or data regarding a position of the second user. The data can be communicated between the first user and the second user and/or between a central communication unit and the first and second user.

Figure 4:
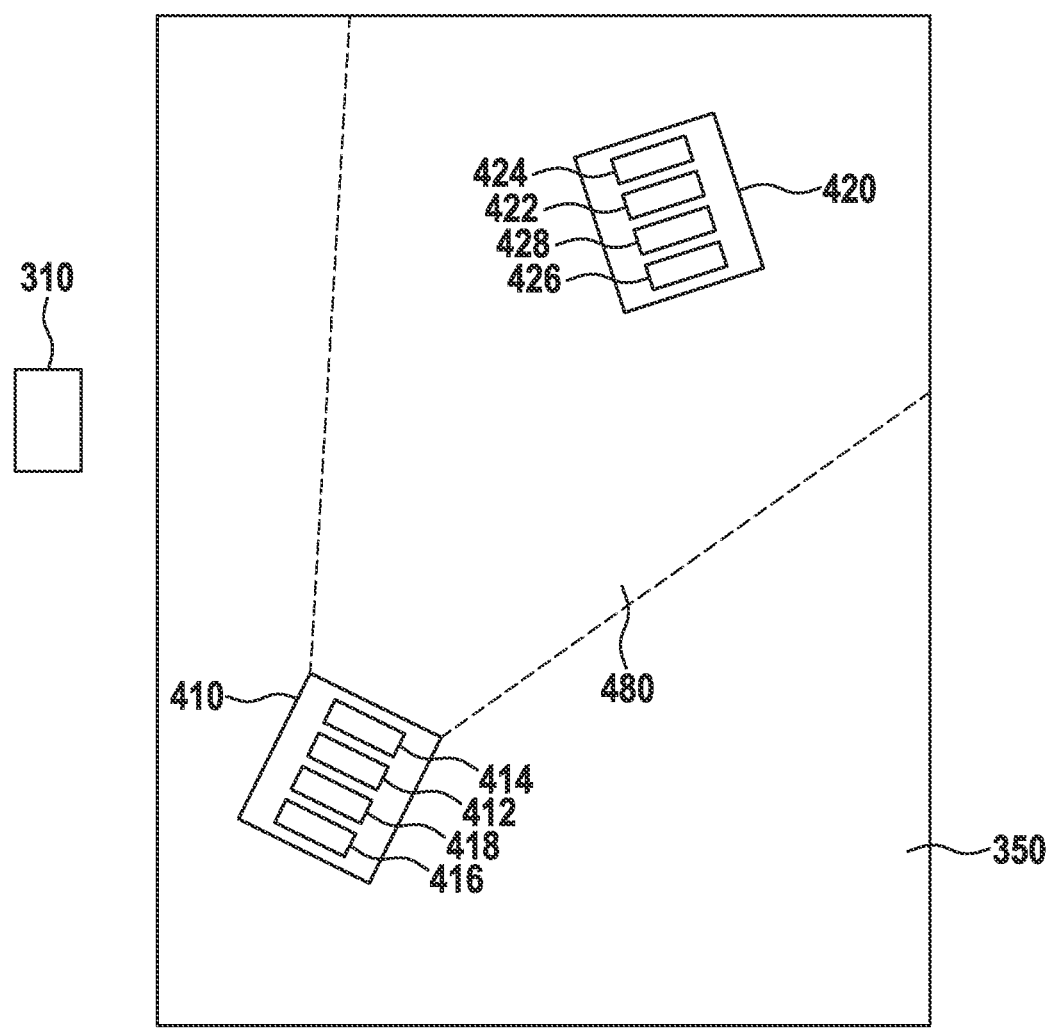
FIGS. 4-8 shows a multi-user virtual reality system for providing a virtual reality experience to a plurality of users in a body of water according to embodiments described herein.

As shown for example in FIG. 4, the communication system may include a first wireless communication unit 416 included in the equipment 410 which is configured to be mounted to the first user. The communication system may include a second wireless communication unit 426 included in the equipment 420 which is configured to be mounted to the second user. For example, the first wireless communication unit 416 can be part of a first mobile device and the second wireless communication unit 426 can be part of a second mobile device. The first wireless communication unit 416 and the second wireless communication unit 426 may be configured for communicating with each other and/or with a central communication unit.

As shown for example in FIG. 4, a multi-user virtual reality system 300 according to embodiments described herein can include a data processing system including a first data processing unit 418 included in the equipment 410 which is configured to be mounted to the first user and a second data processing unit 428 included in the equipment 420 which is configured to be mounted to the second user. The first display unit 412 and the first data processing unit 418 may be part of a first mobile device, particularly a smartphone or tablet device. The second display unit 422 and the second data processing unit 428 may be part of a second mobile device, particularly a smartphone or tablet device.

Figure 5:
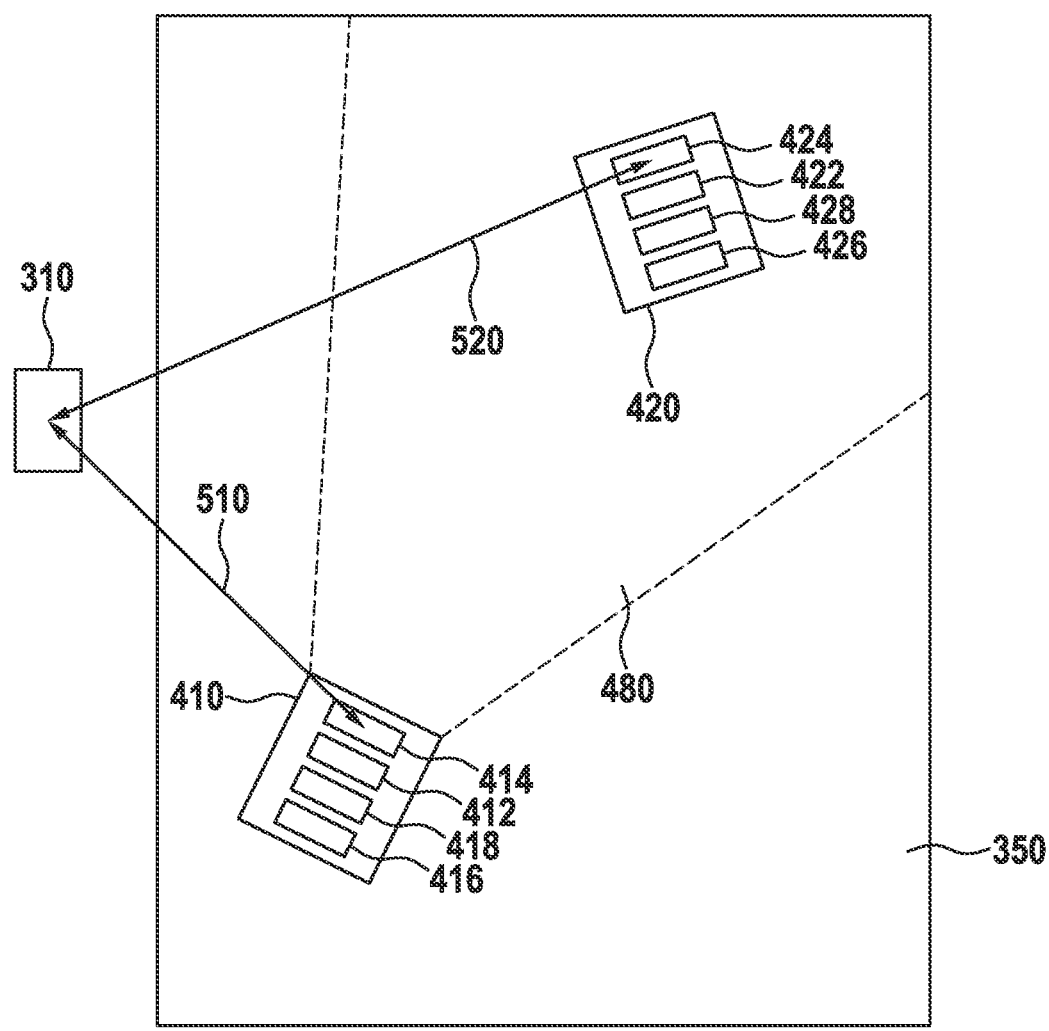
Figure 6:
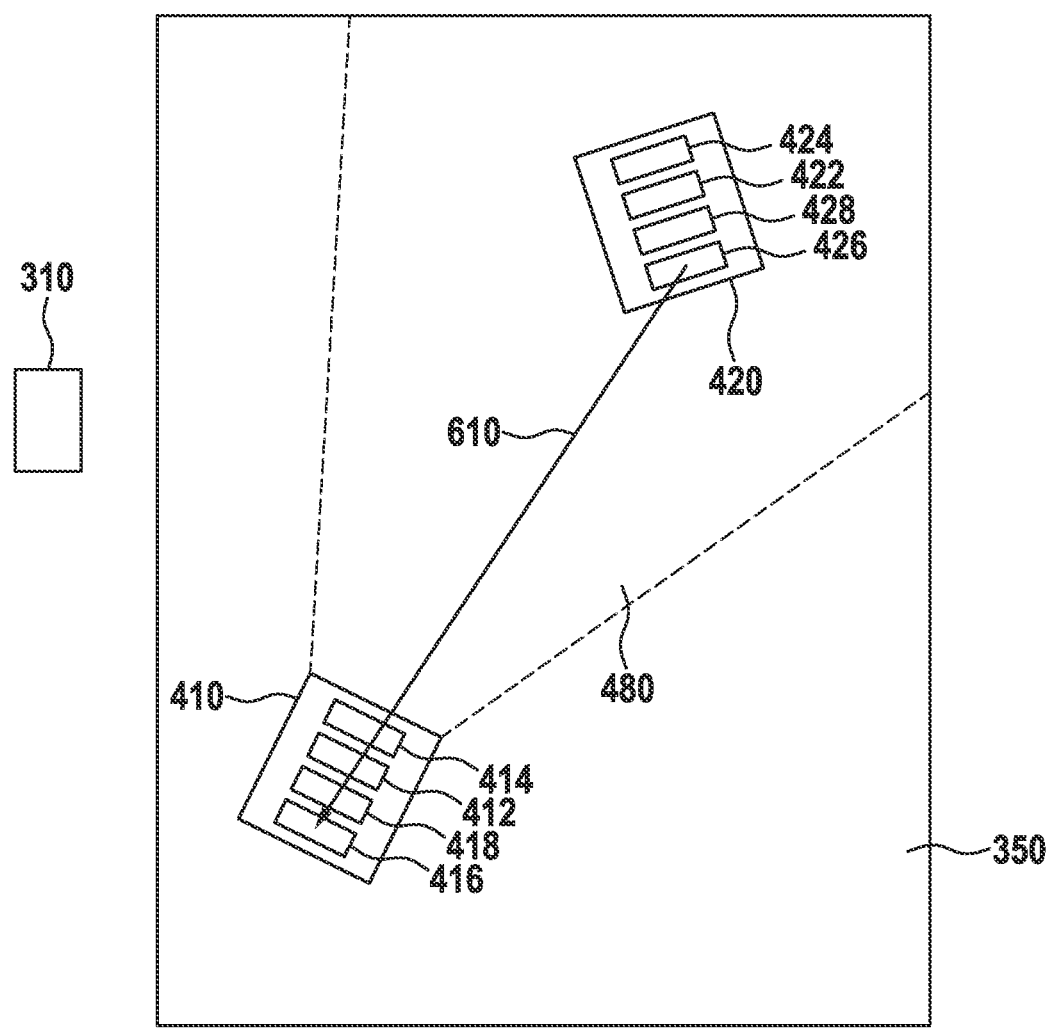

The first data processing unit 418 may be configured for determining a position of the first user in the body of water 350 based on at least one signal transmitted between the first signal emitting or receiving system 414 and the reference system 310. The at least one signal is indicated in FIG. 5 by arrow 510. The first data processing unit 418 may be connected to the first signal emitting or receiving system 414. The at least one signal, or data derived from the at least one signal, may be transmitted from the first signal emitting or receiving system 414 to the first data processing unit 418. Data derived from the at least one signal can be understood as data which is based on the at least one signal, but which need not be identical to the at least one signal. The data derived from the at least one signal can be obtained by processing the at least one signal in manner which preserves the information needed for determining the position of the first user. In other words, the information content of the data derived from the at least one signal can be such that the position of the first user can be determined from the derived data.

The second data processing unit 428 may be configured for determining a position of the second user in the body of water 350 based on at least one signal transmitted between the second signal emitting or receiving system 424 and the reference system 310. The at least one signal is indicated in FIG. 5 by arrow 520. The second data processing unit 428 may be connected to the second signal emitting or receiving system 424. The at least one signal, or data derived from the at least one signal, may be transmitted from the second signal emitting or receiving system 424 to the second data processing unit 428.

The communication system may be configured for transmitting the determined position of the second user, or data derived from the determined position of the second user, to the first data processing unit. For example, as illustrated by arrow 610 in FIG. 6, the second wireless communication unit 426 may be configured for transmitting the determined position of the second user, or the data derived from the determined position of the second user, to the first wireless communication unit 416.

Alternatively, instead of determining the position of the second user by the second data processing unit 428, the at least one signal transmitted between the second signal emitting or receiving system 424 and the reference system 310 can be sent to the first data processing unit 418, such that the latter can determine the position of the second user. The communication system can be configured for transmitting the at least one signal transmitted between the second signal emitting or receiving system 424 and the reference system 310, or data derived from the at least one signal, to the first data processing unit 418. The first data processing unit 418 can be configured for determining the position of the second user in the body of water 350 based on the at least one signal transmitted between the second signal emitting or receiving system 424 and the reference system 310.

The first data processing unit 418 can be configured for determining whether the second user in the body of water 350 is within a first target region 480 relative to the first user in the body of water 350. FIGS. 4-8 show a first target region 480, namely the portion of the body of water 350 which in contained within the dashed lines. The first target region 480 can be a field of view of the first user. In the situation shown in FIGS. 4-8, the second user is in the first target region 480. Accordingly, the data processing system, e.g. the first data processing unit 418 of the data processing system, is configured to instruct the first display unit 412 to display virtual reality content to the first user, wherein the displayed virtual reality content includes a representation of the second user.

Figure 7:
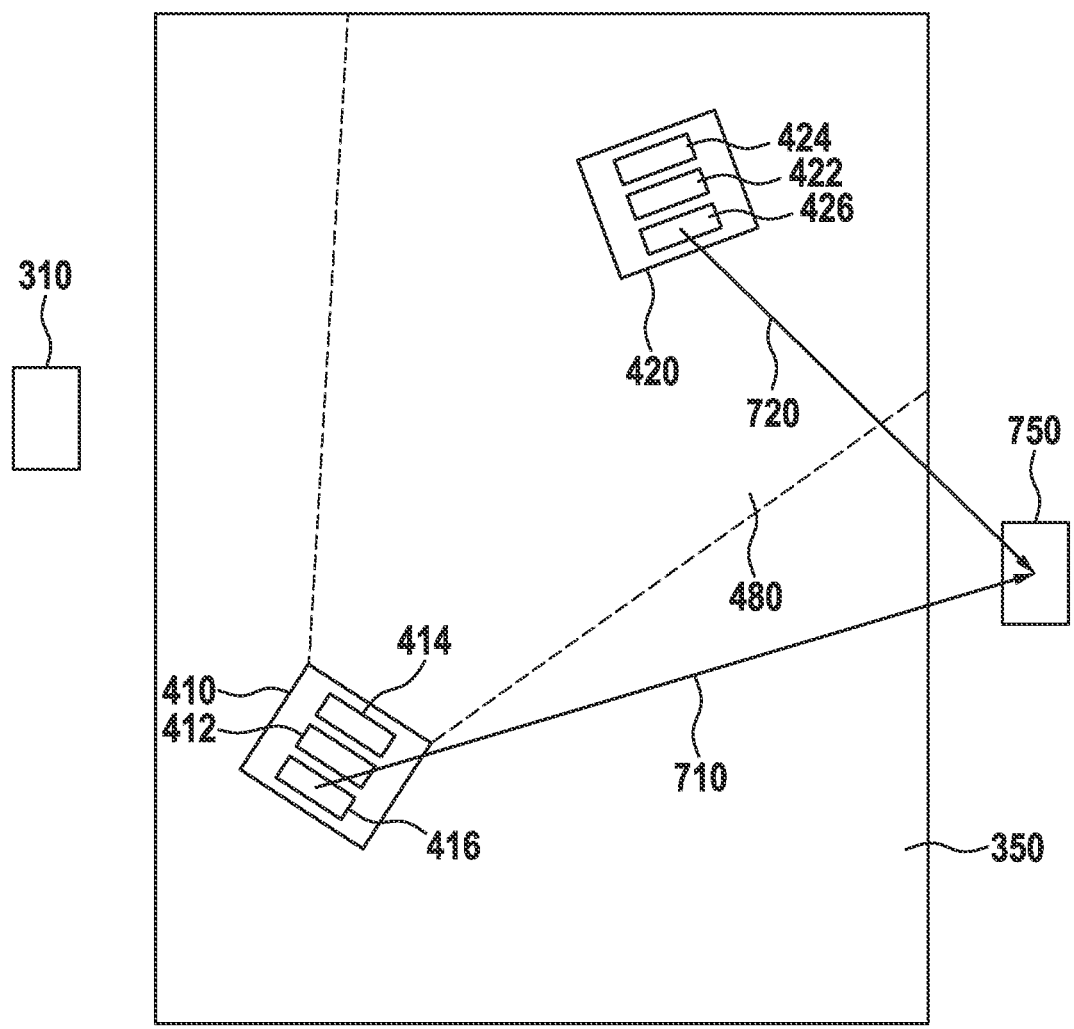
Figure 8:
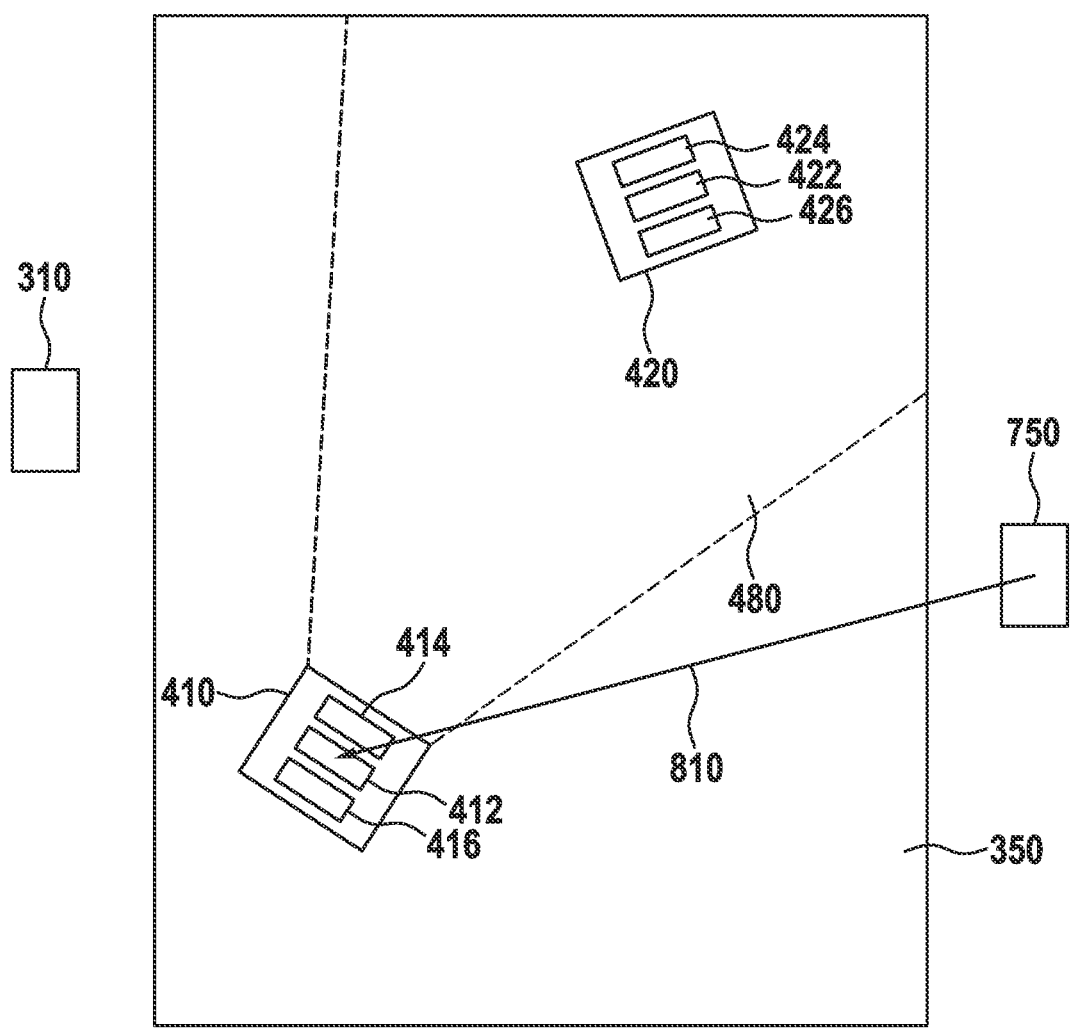

Alternative or additional to a data processing system including a first data processing unit 418 and a second data processing unit 428 i.e. "local" data processing units carried by the respective users, the data processing system can include a central data processing unit 750, as shown for example in FIG. 7.

The central data processing unit 750 can be connected, e.g. via the communication system, to at least one of the first signal emitting or receiving system 414, the second signal emitting or receiving system 424, the first display unit 412 and/or the second display unit 422.

The central data processing unit 750 can be configured for receiving at least one signal transmitted between the first signal emitting or receiving system 414 and the reference system 310, or data derived from the at least one signal, as illustrated by arrow 710 in FIG. 7. The signal, or the derived data, can be sent to the central data processing unit 750, for example, by the first wireless communication unit 416 (as shown in FIG. 7), by the first signal emitting or receiving system 414 or by the reference system 310. The central data processing unit 750 can be configured for determining a position of the first user in the body of water based on the at least one signal.

The central data processing unit 750 can be configured for receiving at least one signal transmitted between the second signal emitting or receiving system 424 and the reference system 310, or data derived from the at least one signal, as illustrated by arrow 720 in FIG. 7. The signal, or the derived data, can be sent to the central data processing unit 750, for example, by the second wireless communication unit 426 (as shown in FIG. 7), by the second signal emitting or receiving system 424 or by the reference system 310. The central data processing unit 750 can be configured for determining a position of the second user in the body of water 350 based the on at least one signal.

The central data processing unit 750 may be configured for determining whether the second user in the body of water 350 is within a first target region 480 relative to the first user in the body of water 350. The central data processing unit 750 may be configured for instructing the first display unit 412 to display virtual reality content to the first user in the body of water 350, as shown for example in FIG. 8 by arrow 810. If it is determined that the second user in the body of water is inside the first target region 480 relative to the first user, the displayed virtual reality content includes a representation of the second user.

If the boundary of the body of water (e.g. the edge of the swimming pool) is within the field of view of a user, a representation of the boundary can be included in the virtual reality content shown to the user, so that the user can avoid the boundary if the user wants to keep swimming or so that the user can move toward the boundary if the user wants to leave the body of water. According to embodiments, the data processing system may be configured for determining whether a boundary of the body of water is inside a second target region relative to the first user. The second target region may be a field of view of the first user or a different target region. The second target region may be the same as the first target region or different from the first target region. If it is determined that the boundary of the body of water is inside the second target region, the virtual reality content displayed by the first display unit includes a representation of the boundary of the body of water.

The multi-user virtual reality system according to embodiments described herein may include devices for determining the spatial orientation of each user, particularly of the head of each user, in the body of water.

By determining the spatial orientation of a user's head, it can be determined in which way the user is looking e.g. the field of view of the user can be determined. Based thereon, it can be determined what the virtual reality content displayed to the user should include. For example, it can be determined which representations of other users should be shown in the virtual reality content, whether a representation of the boundary of the body of water should be shown in the virtual reality content or which other images (e.g. images of fish or underwater plants) should be shown in the virtual reality content.

Particularly, the spatial orientation or pose of the display unit carried by each user can be determined, since the display unit faces the user's eyes. For determining the spatial orientation of a display unit, there are several possibilities. For example, a plurality of sensors including one or more accelerometers (e.g. a 3-axis accelerometer), one or more gyroscopes (e.g. a 3-axis gyroscope) and/or one or more magnetometers (e.g. a 3-axis magnetometer) can be included in the equipment worn by the user, e.g. the swimming mask. Some of these sensors may me integrated together as part of an inertial measurement unit. If the display unit is part of a mobile device, e.g. a smart phone, the aforementioned sensors are often standardly included in the mobile device. Alternatively, if the display unit is a stand-alone display unit, the sensors in question can be included in the equipment as separate hardware components.

For example, one or more magnetometers may provide a compass. The compass can be used for determining the direction in which the display unit is facing relative to global north direction. For example, the one or more magnetometers may be configured for determining a heading of the display unit. The heading, or heading angle, can be understood as an angle in a plane parallel to the earth's surface, more particularly an angle between a horizontal axis extending through the display unit and a horizontal reference axis pointing towards, for example, the global north.

The determination of the heading of the display unit may be carried out for determining an initial orientation of the display unit. The determination of the heading can be supplemented by measurements performed by other sensors, e.g. one or more accelerometers and/or one or more gyroscopes, for determining the full pose of the display unit. For example, an inertial measurement unit can be used for determining a complete set of degrees of freedom representing the pose of the display unit in 3-dimensional space. After the initial orientation of the display unit is determined, changes to the orientation of the display unit may be tracked, for example by the inertial measurement unit. Accordingly, the orientation of the display unit can be known at all times.

If a compass is used for determining the heading, an offset between the coordinate system of the body of water, which is defined by the reference system, and the global north direction can be determined. This calculation can be performed in a calibration procedure as described below. When the offset between the reference system and global north direction is known, the orientation of the display unit with respect to the global north direction (provided by the compass) and the offset in question can be composed with each other to determine the orientation of the display unit with respect to the reference system.

In further implementations, the orientation of the display unit may be determined using a signal emitting or receiving system carried by the user. For example, the signal emitting or receiving system can include two or more radio-based receivers arranged at a distance from each other. The two or more radio-based receivers can be connected to the display unit carried by the user. A radio-based reference system emits radio signals which are received by each of the two or more radio-based receivers. Based on the received radio signals, the position of each of the two or more radio-based receivers relative to the reference system can be determined (angle-of-arrival method). Since thereby the positions of multiple receivers connected to the display unit are determined, this allows determining the spatial orientation of the display unit relative to the reference system.

Likewise, instead of radio-based systems, optical systems can be used to obtain a similar result, e.g. the signal emitting or receiving system can include two or more optical receivers (e.g. IR-LEDs) arranged at a distance from each other and connected to the display unit.

When the above two implementations involving the signal emitting or receiving system are used for determining the orientation of the display unit, a compass may not be necessary. The two implementations in question may be more precise and faster than a compass, since magnetometers often perform measurements at a relatively low frequency and can be imprecise e.g. if they are in the vicinity of magnetic devices which influence the earth's magnetic field.

The measurement results of the measurements performed by the various sensors described herein can be processed and combined with each other to determine the full spatial orientation (6-DOF pose and heading angle) of the display unit of a user. Sensor fusion techniques, such as for example a complementary Kalman filter, can be used for this.

The equipment which is configured to be mounted to the first user can include a first orientation-determining system adapted for emitting and/or receiving signals for determining a spatial orientation of the first display unit. The first orientation-determining system may include at least one of an accelerometer, a gyroscope and a magnetometer. The data processing system may be configured for determining the spatial orientation of the first display unit based on the signals in question. The virtual reality content displayed by the first display unit may be based on data provided by the first orientation-determining system.

The equipment which is configured to be mounted to the second user can include a second orientation-determining system adapted for emitting and/or receiving signals for determining a spatial orientation of the second display unit. The second orientation-determining system may include at least one of an accelerometer, a gyroscope and a magnetometer. The data processing system may be configured for determining the spatial orientation of the second display unit based on the signals in question. The virtual reality content displayed by the first display unit may be based on data provided by the second orientation-determining system.

Referring e.g. to FIGS. 1-2, the display-receiving enclosure 120 can be sealed in a water- and air-tight manner so that the mobile device 220 in the display-receiving enclosure 120 is surrounded by a volume of air when the swimming mask 102 is in use in the body of water 350. This if beneficial for using wireless communication such as WIFI or Bluetooth, since the latter work poorly or not at all when the mobile device is surrounded by water. Alternatively or additionally, an antenna can be connected to the mobile device 220 disposed in the display-receiving enclosure 120. The wireless communication between the mobile device 220 and other mobile devices can be performed using the antenna. The upper end of the antenna can be configured for receiving a wireless signal. The antenna can have a length which is sufficiently long to allow the upper end of the antenna to be above water when the user wearing the swimming mask 102 is swimming. For example, the length of the antenna can be comparable to the length of the breathing tube 106. In such case, the upper end of the antenna is surrounded by air, so that the wireless communication is not compromised even when the display-receiving enclosure 120 contains water i.e. even when the mobile device 220 is not surrounded by air.

A signal receiving portion of the first wireless communication unit may be configured to be surrounded by a volume of air when the equipment which is configured to be mounted to the first user is mounted to the first user swimming in the body of water. A signal receiving portion of the second wireless communication unit may be configured to be surrounded by a volume of air when the equipment which is configured to be mounted to the second user is mounted to the second user swimming in the body of water. A signal receiving portion of a wireless communication unit can be understood, for example, as a WIFI port of the wireless communication unit (e.g. a WIFI port of a mobile device 220). Alternatively, a signal receiving portion can be understood as an upper end of an antenna included in the wireless communication unit, as described above.

The multi-user virtual reality system according to embodiments described herein may be configured for providing a virtual reality experience to a plurality of users at a same time, e.g. 3 or more, 10 or more, or even more users, at a same time. The multi-user virtual reality system may include equipment configured to be mounted to a third user in the body of water, wherein the equipment includes a third display unit and a third signal emitting or receiving system adapted for emitting and/or receiving signals. The data processing system may be configured for determining a position of the third user in the body of water based on at least one signal transmitted between the third signal emitting or receiving system and the reference system. The data processing system may be configured for determining whether the third user in the body of water is within the first target region relative to the first user in the body of water. If it is determined that the third user in the body of water is inside the first target region relative to the first user, the virtual reality content displayed to the first user may include a representation of the third user. If it is determined that the second user and the third user are inside the first target region relative to the first user at a same time, the virtual reality content displayed to the first user may simultaneously include a representation of the second user and a representation of the third user.

The data processing system of a multi-user virtual reality system according to embodiments described herein may be configured for determining whether the first user in the body of water is within a target region relative to the second user in the body of water. For example, the target region may be a field of view of the second user. The data processing system may be configured for instructing the second display unit to display virtual reality content to the second user in the body of water. If it is determined that the first user in the body of water is inside the target region relative to the second user, the displayed virtual reality content may include a representation of the first user.

According to a further embodiment, a method for providing a virtual reality experience to a plurality of users in a body of water is provided. The method includes mounting equipment to a first user, the equipment including a first display unit and a first signal emitting or receiving system. The method includes mounting equipment to a second user, the equipment including a second display unit and a second signal emitting or receiving system. The method includes transmitting at least one signal between the first signal emitting or receiving system and a reference system. The method includes determining a position of the first user in the body of water based on the at least one signal transmitted between the first signal emitting or receiving system and the reference system. The method includes transmitting at least one signal between the second signal emitting or receiving system and the reference system. The method includes determining a position of the second user in the body of water based on the at least one signal transmitted between the second signal emitting or receiving system and the reference system. The method includes determining whether the second user in the body of water is within a first target region relative to the first user in the body of water. The method includes displaying, using the first display unit, virtual reality content to the first user in the body of water, wherein, if it is determined that the second user in the body of water is inside the first target region relative to the first user, the displayed virtual reality content includes a representation of the second user.

Embodiments described herein can be carried out using a computer program, e.g. a smartphone app or tablet app. The computer program can be configured for determining the positions of the users in the body of water, or at least for receiving data regarding the positions in question if the users' positions are computed at a different location. The computer program can further be configured for determining whether a second user is within a first user's field of view. The computer program can further be configured, based on the determined positions of the users in the body of water, for generating data which, when transmitted to a display unit, causes the display unit to display the virtual reality content as described herein. The virtual reality content shown to each user may include representations of all other users which are in the user's field of view, may include a representation of the boundary of the body of water if the user comes close to said boundary, and/or may include an underwater scenery such as fish and plants, as described herein.

According to a further embodiment, a computer program for providing a virtual reality content to a first user of a plurality of users in a body of water is provided. The computer program includes instructions which, when the program is executed by a computer, cause the computer to carry out the following operations: determining a position of the first user in the body of water, or acquiring data regarding the position of the first user in the body of water; determining a position of a second user in the body of water, or acquiring data regarding the position of second user in the body of water; determining whether the second user in the body of water is within a first target region relative to the first user in the body of water; and instructing a display unit to display virtual reality content to the first user in the body of water, wherein, if it is determined that the second user in the body of water is inside the first target region relative to the first user, the displayed virtual reality content includes a representation of the second user.

That the computer acquires data regarding a position of the first or second user can be understood in the sense that the data in question is made available for being further processed. For example, acquiring data may include receiving the data (e.g. via wireless communication as described herein) and storing the data in a memory of the computer so that the data is available for the subsequent operations of the computer program.

The computer program may be configured for at least one of the following: calibrating a reference system, wherein the reference system is configured for determining the position of the first user and the position of the second user relative to the reference system, wherein calibrating the reference system includes determining a position and/or a spatial orientation of at least one reference unit of the reference system; determining an offset between a compass-indicated direction or position (e.g. a direction of global north) and a reference direction or position defined by the reference system; and determining a shape of a boundary of the body of water and/or a position of the reference system relative to the boundary of the body of water.

A computer program as described herein may be configured for a calibration of the reference system. Calibrating the reference system may be understood as determining the position(s) of the reference unit(s) of the reference system so that a coordinate system of the reference system can be defined. The coordinate system can include an origin defined by a reference unit of the reference system. The coordinate system is used to determine the positions of the users in the body of water with respect to the coordinate system.

For example, if the reference system is a radio-based reference system, e.g. an UWB reference system, the calibration may proceed as follows. One of the reference units (beacons) may be set to be the origin of the coordinate system. The origin can be selected by a user via the computer program (smartphone app) or the origin can be predefined. A further reference unit can be selected (again, either by user selection or predefined) so that the further reference unit together with the origin define a reference axis (X-axis) of the coordinate system. The positions of all reference units with respect to the origin are determined. The determined positions can be communicated to the reference system, e.g. using Bluetooth communication.

For example, if the reference system is an optical reference system, e.g. a reference system using IR cameras, the calibration may proceed as follows. A signal emitting or receiving system (e.g. a signal emitting or receiving system 110 mounted to a breathing tube 106 a swimming mask assembly 100) including one or more IR-LEDs is moved in front of each reference unit (IR camera) so that all reference units can make images of the IR-LED(s). Based on the images created accordingly by the reference units, the relative positions and orientations of the reference units with respect to each other can be determined. As described above, one of the reference units can be set to be the origin of the coordinate system of the reference system Another reference unit can be used to determine a reference axis.

Additionally or alternatively, a computer program as described herein may be configured for determining an offset between a compass-indicated direction or position and a reference direction or position defined by the reference system. For example, the computer program may be configured for determining the spatial relation or offset between global north (or a different compass-indicated direction, e.g. global south) and the coordinate system defined by the reference system. Global north can be understood as a direction pointing towards the earth's magnetic north pole as provided by a compass. For example, a mobile device of one of the users can be positioned to align the mobile device with a reference axis (e.g. the X-axis) of the coordinate system of the reference system. For example, a longitudinal axis of the mobile device can be aligned with the reference axis. With the mobile device in this position, the compass of the mobile device is used to determine the direction of global north. Accordingly, the offset between the reference axis and the global north direction can be estimated. The offset in question is transmitted to (the mobile devices of) all users, e.g. using WIFI. Accordingly, each user can store the offset in question. For determining a position of a user, the position of the user relative to global north can be determined using the compass, and the offset between global north and the reference axis can be used to determine the position of the user relative to the coordinate system of the reference system.

Additionally or alternatively, a computer program as described herein may be configured for determining a shape of the boundary of the body of water and/or a position of the reference system relative to a boundary of the body of water. There can be a distance between the reference units and the boundary of the body of water, or the body of water can have a non-rectangular shape (e.g. circular or curved). In order to allow for a correct collision prevention with the boundary of the body of water, the system can be made aware of the true position and shape of the boundary of the body of water with respect to the coordinate system defined by reference system.

For example, for determining the position and shape of the body of water, the computer program can provide a set of possible pre-defined shapes for the body of water. The pre-defined shapes may be shown on a mobile device of a user. The user can select the pre-defined shape which corresponds to the shape of the body of water. The mobile device can further display the positions of the reference units and allow the user to center the selected shape (e.g. a rectangular shape) with respect to the displayed reference units. The computer program can determine the offset between the reference units and the boundary of the body of water. For example, if the selected shape is rectangular, the computer program can allow the user to drag the corners of the selected rectangular shape to the displayed positions of the reference units, so that the offsets between the reference units and the corners of the rectangular shape can be determined. In the case of a body of water having a more complicated shape (circular, curved), the computer program can be configured for allowing the user to drag control points (e.g. using Bezier splines), hence deforming the selected shape until it resembles the actual shape of the body of water.

In another example, a user carrying a signal emitting or receiving system (e.g. a signal emitting or receiving system 110 mounted to a breathing tube 106 a swimming mask assembly 100) can move along the boundary of the body of water. Using the signal emitting or receiving system, the position of the user can be determined at a plurality of positions along the body of water. Accordingly, based on the determined plurality of positions, the shape of the boundary of the body of water, and its position with respect to the reference units, can be determined.

Additionally or alternatively, a computer program as described herein may be configured for controlling a signal emitting or receiving system carried by a user for determining a position of the signal emitting or receiving system relative to the reference system.

Additionally or alternatively, a computer program as described herein may be configured for controlling the wireless communication between a user and other users in the body of water.

According to a further embodiment, a swimming mask assembly is provided. The swimming mask assembly includes a swimming mask. The swimming mask assembly includes a display unit. The swimming mask assembly includes a signal emitting or receiving system. The swimming mask assembly includes a wireless communication unit configured to communicate directly or indirectly with a further wireless communication unit of a further swimming mask assembly. The swimming mask assembly includes a data processing unit. The data processing unit is configured for determining a position of the swimming mask assembly based on at least one signal transmitted between the signal emitting or receiving system and a reference system. The data processing unit is configured for receiving data regarding a position of the further swimming mask assembly via the wireless communication unit. The data processing unit is configured for determining whether the further swimming mask assembly is within a first target region relative to the swimming mask assembly. The data processing unit is configured for instructing the display unit to display virtual reality content, wherein, if it is determined that the further swimming mask assembly is inside the first target region, the displayed virtual reality content includes a representation of a user wearing the further swimming mask assembly.

Figure 9:
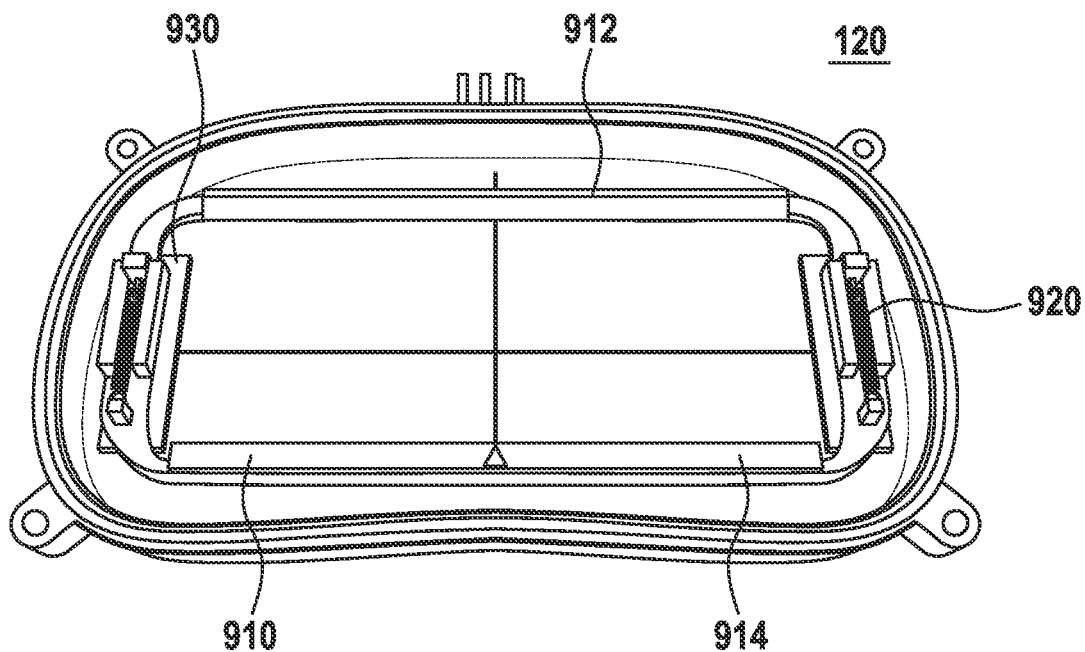
FIGS. 9-10 show a swimming mask assembly according to embodiments described herein.
Figure 10:
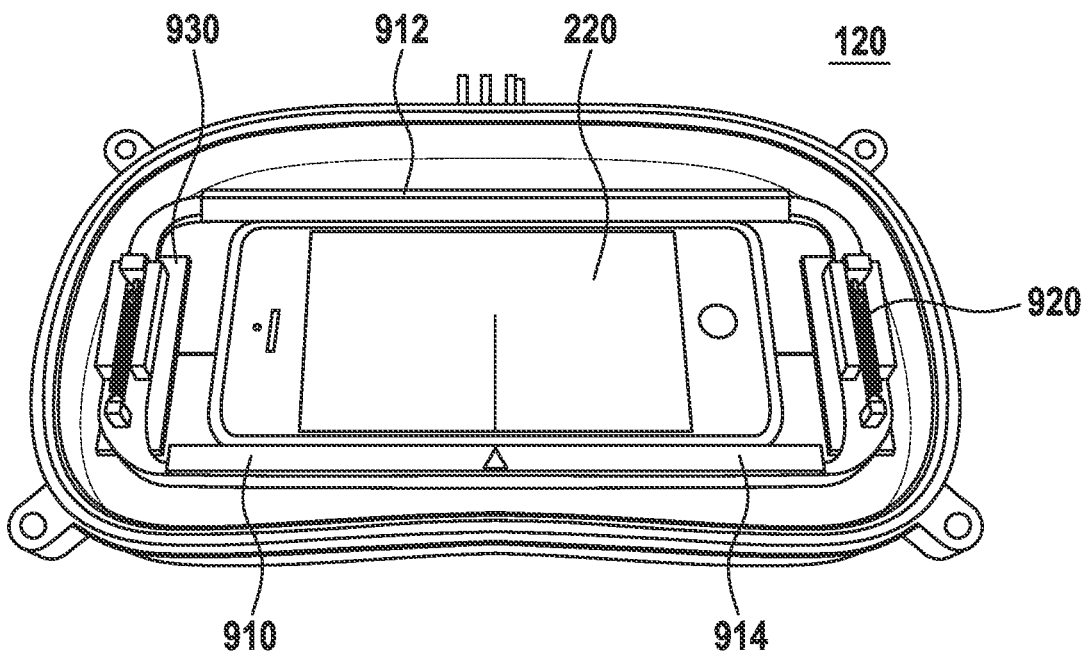

FIGS. 9-10 show a portion of a display-receiving enclosure 120 of a swimming mask assembly according to embodiments described herein. The display-receiving enclosure 120 includes a support 910 for holding a mobile device, e.g. a smartphone. The support 910 may be removably attached to a wall of the display-receiving enclosure 120. For example, a magnetic foil 930 can be used for removably attaching the support 910.

The support 910 includes one or more movable support elements. For example, the support 910 can include a first support element 912 and a second support element 914 which are movable relative to each other. The support 910 can include one or more flexible elements 920, e.g. springs, for allowing the first support element 912 and the second support element 914 to move relative to each other. The support 910 can be shaped to provide a frame for holding a mobile device. The frame can surround the mobile device.

The support 910 can be configured for supporting mobile devices 220 having different sizes. For example, a position of the first support element 912 and a position of the second support element 914 relative to each other may be adjustable, so that the size of the frame can be adjusted. Accordingly, mobile devices of different sizes can be supported by the same support 910.

At least one support element of the support 910 can be movable so that a vertical position of the mobile device held by the support 910 can be adjusted. Accordingly, regardless of the size of the mobile device 220, it can be ensured that the display unit of the mobile device is in the correct position for facing the user's eyes.

In light of the above, according to a further embodiment, a swimming mask assembly is provided. The swimming mask assembly includes a swimming mask. The swimming mask assembly includes a signal emitting or receiving system mounted to the swimming mask. The swimming mask assembly includes an enclosure mounted to the swimming mask, e.g. the display-receiving enclosure 120 shown in FIGS. 9-10. The enclosure includes a support for holding a mobile device, wherein the support includes one or more movable support elements configured for adjusting a relative position of the mobile device with respect to the swimming mask.

As shown for example in FIGS. 9-10, the support 910 can be arranged adjacent to an exterior wall of the display-receiving enclosure 120 such that the mobile device held by the support 910 can be recharged wirelessly through the exterior wall by a charging station outside the display-receiving enclosure 120. Accordingly, the mobile device can be conveniently recharged without opening the display-receiving enclosure 120. The display-receiving enclosure 120 may not include any components or parts between the exterior wall and the mobile device held by the support 910. In particular, the display-receiving enclosure 120 may not include any components or parts between the exterior wall and a region where the battery of the mobile device held by the support 910 is located. Such components or parts would prevent, or at least disrupt, the possibility of wirelessly recharging the mobile device while the mobile device is in the display-receiving enclosure 120. For example, by providing a support 910 shaped as a frame for holding the mobile device, as described above, the support 910 does not include any part or component separating the exterior wall from the region where the battery of the mobile device held by the frame is located. The support 910 may be configured for supporting the mobile device in a manner such that the mobile device held by the support 910 contacts the exterior wall of the display-receiving enclosure 120.

The aspect according to which the support is arranged adjacent to the exterior wall of the display-receiving enclosure for allowing a wireless charging can be provided in combination with or separate from the above-described aspect according to which movable support elements are provided for adjusting a relative position of the mobile device with respect to the swimming mask.

According to a further embodiment, a swimming mask assembly is provided. The swimming mask assembly includes a swimming mask. The swimming mask assembly includes a signal emitting or receiving system mounted to the swimming mask. The swimming mask assembly includes an enclosure mounted to the swimming mask. The enclosure includes a support for holding a mobile device in the enclosure, wherein the support is arranged adjacent to an exterior wall of the enclosure such that the mobile device held by the support can be recharged wirelessly through the exterior wall by a charging station outside the enclosure. The support can be shaped to provide a frame for holding the mobile device adjacent to the exterior wall.

A signal emitting or receiving system of a swimming mask assembly can be detachably mounted to the swimming mask of the swimming mask assembly. The signal emitting or receiving system can be detachably mounted to the swimming mask using a non-magnetic adhesive material. The signal emitting or receiving system may be mounted to a breathing tube of the swimming mask. The signal emitting or receiving system may be wirelessly rechargeable An enclosure of a swimming mask assembly may be detachably mounted to the swimming mask of the swimming mask assembly. The enclosure may be detachably mounted to the swimming mask using a non-magnetic adhesive material.

While the foregoing is directed to embodiments of the disclosure, other and further embodiments of the disclosure may be devised without departing from the basic scope thereof, and the scope thereof is determined by the claims that follow.

The invention claimed is:

1. A multi-user virtual reality system for providing a virtual reality experience to a plurality of users in a body of water, the multi-user virtual reality system comprising:
   a reference system adapted for emitting and/or receiving signals;
   equipment configured to be mounted to a first user in the body of water, the equipment comprising:
      a first display unit; and
      a first signal emitting or receiving system adapted for emitting and/or receiving signals;
   equipment configured to be mounted to a second user in the body of water, the equipment comprising:
      a second display unit; and
      a second signal emitting or receiving system adapted for emitting and/or receiving signals; and
   a data processing system including one or more data processing units configured for:
      determining a position of the first user in the body of water based on at least one signal transmitted between the first signal emitting or receiving system and the reference system;
      determining a position of the second user in the body of water based on at least one signal transmitted between the second signal emitting or receiving system and the reference system;
      determining whether the second user in the body of water is within a first target region relative to the first user in the body of water; and
      instructing the first display unit to display virtual reality content to the first user in the body of water, wherein, if it is determined that the second user in the body of water is inside the first target region relative to the first user, the displayed virtual reality content includes a representation of the second user.

2. The multi-user virtual reality system of claim 1, wherein the equipment configured to be mounted to the first user includes a first swimming mask assembly, wherein the first swimming mask assembly includes:
   a first swimming mask;
   the first display unit; and
   the first signal emitting or receiving system,
wherein the equipment configured to be mounted to the second user includes a second swimming mask assembly, wherein the second swimming mask assembly includes:
   a second swimming mask;
   the second display unit; and
   the second signal emitting or receiving system.

3. The multi-user virtual reality system of claim 1, wherein the multi-user virtual reality system further comprises:
   a communication system providing a direct or indirect communication between the equipment which is configured to be mounted to the first user and the equipment which is configured to be mounted to the second user, wherein the communication system is configured for transmitting data regarding a position of the first user and/or data regarding a position of the second user.

4. The multi-user virtual reality system of claim 3, wherein the communication system includes:
   a first wireless communication unit included in the equipment which is configured to be mounted to the first user; and
   a second wireless communication unit included in the equipment which is configured to be mounted to the second user.

5. The multi-user virtual reality system of claim 4, wherein:
   a signal receiving portion of the first wireless communication unit is surrounded by a volume of air when the equipment which is configured to be mounted to the first user is mounted to the first user swimming in the body of water; and
   a signal receiving portion of the second wireless communication unit is surrounded by a volume of air when the equipment which is configured to be mounted to the second user is mounted to the second user swimming in the body of water.

6. The multi-user virtual reality system of claim 1, wherein the data processing system includes:
   a first data processing unit included in the equipment which is configured to be mounted to the first user, wherein the first data processing unit is configured for determining the position of the first user in the body of water based on the at least one signal transmitted between the first signal emitting or receiving system and the reference system.

7. The multi-user virtual reality system of claim 6, wherein the data processing system further includes a second data processing unit included in the equipment which is configured to be mounted to the second user, wherein the multi-user virtual reality system is further configured for at least one of (a) or (b),
   wherein (a) includes:
      determining, by the second data processing unit, the position of the second user in the body of water based on the at least one signal transmitted between the second signal emitting or receiving system and the reference system; and
      transmitting, by the communication system, the determined position of the second user, or data derived from the determined position of the second user, to the first data processing unit, and
   wherein (b) includes:
      transmitting, by the communication system, the at least one signal transmitted between the second signal emitting or receiving system and the reference system, or data derived from the at least one signal, to the first data processing unit; and
      determining, by the first data processing unit, the position of the second user in the body of water based on the at least one signal transmitted between the second signal emitting or receiving system and the reference system.

8. The multi-user virtual reality system of claim 7, wherein the first display unit and the first data processing unit are part of a first mobile device, and wherein the second display unit and the second data processing unit are part of a second mobile device.

9. The multi-user virtual reality system of claim 8, wherein the first mobile device is a smartphone or tablet device and/or wherein the second mobile device is a smartphone or tablet device.

10. The multi-user virtual reality system of claim 1, wherein the multi-user virtual reality system is configured for allowing the first user and the second user to move freely in the body of water.

11. The multi-user virtual reality system of claim 1, wherein the data processing system is configured for determining whether a boundary of the body of water is inside a second target region relative to the first user, wherein, if it is determined that the boundary of the body of water is inside the second target region, the virtual reality content displayed by the first display unit includes a representation of the boundary of the body of water.

12. The multi-user virtual reality system of claim 1, wherein the equipment which is configured to be mounted to the first user further includes:
   a first orientation-determining system adapted for emitting and/or receiving signals for determining a spatial orientation of the first display unit,
   wherein the virtual reality content displayed by the first display unit is based on data provided by the first orientation-determining system.

13. The multi-user virtual reality system of claim 12, wherein the first orientation-determining system includes at least one of an accelerometer, a gyroscope or a magnetometer.

14. The multi-user virtual reality system of claim 1, wherein at least a portion of the reference system is arranged outside a periphery of the body of water.

15. The multi-user virtual reality system of claim 1, wherein the reference system is an ultra-wide band reference system including one or more beacons or an optical reference system including one or more cameras.

16. A method for providing a virtual reality experience to a plurality of users in a body of water, comprising:
   mounting equipment to a first user, the equipment comprising:
      a first display unit; and
      a first signal emitting or receiving system;
   mounting equipment to a second user, the equipment comprising:
      a second display unit; and
      a second signal emitting or receiving system,
   transmitting at least one signal between the first signal emitting or receiving system and a reference system;
   determining a position of the first user in the body of water based on the at least one signal transmitted between the first signal emitting or receiving system and the reference system;
   transmitting at least one signal between the second signal emitting or receiving system and the reference system;
   determining a position of the second user in the body of water based on the at least one signal transmitted between the second signal emitting or receiving system and the reference system;
   determining whether the second user in the body of water is within a first target region relative to the first user in the body of water; and
   displaying, using the first display unit, virtual reality content to the first user in the body of water, wherein, if it is determined that the second user in the body of water is inside the first target region relative to the first user, the displayed virtual reality content includes a representation of the second user.

17. A computer program for providing a virtual reality content to a first user of a plurality of users in a body of water, the computer program comprising instructions which, when the program is executed by a computer, cause the computer to carry out the following operations:
   determining a position of the first user in the body of water, or acquiring data regarding the position of the first user in the body of water;
   determining a position of a second user in the body of water, or acquiring data regarding the position of the second user in the body of water;
   determining whether the second user in the body of water is within a first target region relative to the first user in the body of water; and
   instructing a display unit to display virtual reality content to the first user in the body of water, wherein, if it is determined that the second user in the body of water is inside the first target region relative to the first user, the displayed virtual reality content includes a representation of the second user.

18. A swimming mask assembly, comprising:
   a swimming mask;
   a display unit;
   a signal emitting or receiving system;
   a wireless communication unit configured to communicate directly or indirectly with a further wireless communication unit of a further swimming mask assembly; and
   a data processing unit configured for:
      determining a position of the swimming mask assembly based on at least one signal transmitted between the signal emitting or receiving system and a reference system;
      receiving data regarding a position of the further swimming mask assembly via the wireless communication unit;
      determining whether the further swimming mask assembly is within a first target region relative to the swimming mask assembly; and
      instructing the display unit to display virtual reality content, wherein, if it is determined that the further swimming mask assembly is inside the first target region, the displayed virtual reality content includes a representation of a user wearing the further swimming mask assembly.

* * * * *